United States Patent
Malyak et al.

(10) Patent No.: US 7,697,183 B2
(45) Date of Patent: Apr. 13, 2010

(54) POST-OBJECTIVE SCANNING BEAM SYSTEMS

(75) Inventors: Phillip H. Malyak, Canton, MA (US); John Uebbing, Palo Alto, CA (US); Roger A. Hajjar, San Jose, CA (US)

(73) Assignee: Prysm, Inc., San Jose, CA (US)

( * ) Notice: Subject to any disclaimer, the term of this patent is extended or adjusted under 35 U.S.C. 154(b) by 417 days.

(21) Appl. No.: 11/742,014

(22) Filed: Apr. 30, 2007

(65) Prior Publication Data

US 2008/0247020 A1   Oct. 9, 2008

Related U.S. Application Data

(60) Provisional application No. 60/910,644, filed on Apr. 6, 2007.

(51) Int. Cl.
*G02B 26/08* (2006.01)

(52) U.S. Cl. ............... 359/210.1; 359/216.1

(58) Field of Classification Search ... 359/201.1–202.1, 359/206.1, 210.1–210.2, 213.1–219.2
See application file for complete search history.

(56) References Cited

U.S. PATENT DOCUMENTS

| | | | |
|---|---|---|---|
| 2,439,181 A | 5/1946 | Nicoll | |
| 3,025,161 A | 3/1962 | Thaddeus | |
| 3,556,637 A | 6/1968 | Palmquist | |
| 3,652,956 A | 3/1972 | Pinnow et al. | |
| 3,691,482 A | 9/1972 | Pinnow et al. | |
| 3,750,189 A | 7/1973 | Fleischer | |
| 4,165,154 A | 8/1979 | Takahashi | |
| 4,166,233 A | 8/1979 | Stanley | |
| 4,307,320 A | 12/1981 | Kotera et al. | |
| 4,401,362 A | 8/1983 | Maeda | |
| 4,512,911 A | 4/1985 | Kotera et al. | |
| 4,613,201 A | 9/1986 | Shortle et al. | |
| 4,624,528 A | 11/1986 | Brueggemann | |
| 4,661,419 A | 4/1987 | Nakamura | |
| 4,707,093 A | 11/1987 | Testa | |
| 4,737,840 A | 4/1988 | Morishita | |
| 4,816,920 A | 3/1989 | Paulsen | |
| 4,923,262 A | 5/1990 | Clay | |
| 4,978,202 A | 12/1990 | Yang | |
| 4,979,030 A | 12/1990 | Murata | |

(Continued)

FOREIGN PATENT DOCUMENTS

DE    10044603    4/2001

(Continued)

OTHER PUBLICATIONS

"Fuji Film Color Mosaic Excellent for Image Sensor CM-EXIS," http://www.fujifilm-ffem.com/downloads/Product%20Spotlight%20Color%20Mosaic.pdf (1 page) [accessed May 27, 2008].

(Continued)

*Primary Examiner*—Euncha P Cherry
(74) *Attorney, Agent, or Firm*—Fish & Richardson P.C.

(57) ABSTRACT

Scanning beam systems, apparatus and techniques in optical post-objective designs with two beam scanners for display and other applications.

23 Claims, 14 Drawing Sheets

U.S. PATENT DOCUMENTS

| | | | |
|---|---|---|---|
| 5,054,866 A * | 10/1991 | Tomita et al. ............ 359/201.1 |
| 5,080,467 A | 1/1992 | Kahn et al. |
| 5,089,907 A | 2/1992 | Yoshikawa et al. |
| 5,094,788 A | 3/1992 | Schrenk et al. |
| 5,122,905 A | 6/1992 | Wheatley et al. |
| 5,136,426 A | 8/1992 | Linden et al. |
| 5,138,441 A | 8/1992 | Tanaka |
| 5,140,604 A | 8/1992 | Alablanche et al. |
| 5,146,355 A | 9/1992 | Prince et al. |
| 5,166,944 A | 11/1992 | Conemac |
| 5,175,637 A | 12/1992 | Jones et al. |
| 5,182,659 A | 1/1993 | Clay et al. |
| 5,198,679 A | 3/1993 | Katoh et al. |
| 5,255,113 A | 10/1993 | Yoshikawa et al. |
| 5,269,995 A | 12/1993 | Ramanathan et al. |
| 5,270,842 A | 12/1993 | Clay et al. |
| 5,296,922 A | 3/1994 | Mitani et al. |
| 5,365,288 A | 11/1994 | Dewald et al. |
| 5,389,324 A | 2/1995 | Lewis et al. |
| 5,414,521 A | 5/1995 | Ansley |
| 5,442,254 A | 8/1995 | Jaskie |
| 5,473,396 A | 12/1995 | Okajima et al. |
| 5,475,524 A | 12/1995 | Harris |
| 5,477,285 A | 12/1995 | Riddle et al. |
| 5,477,330 A | 12/1995 | Dorr |
| 5,491,578 A | 2/1996 | Harris |
| 5,526,166 A | 6/1996 | Genovese |
| 5,541,731 A | 7/1996 | Freedenberg et al. |
| 5,550,667 A | 8/1996 | Krimmel et al. |
| 5,587,818 A | 12/1996 | Lee |
| 5,594,556 A | 1/1997 | Vronsky et al. |
| 5,598,292 A | 1/1997 | Yoshikawa et al. |
| 5,602,445 A | 2/1997 | Solanki et al. |
| 5,614,961 A | 3/1997 | Gibeau et al. |
| 5,633,736 A | 5/1997 | Griffith et al. |
| 5,646,766 A | 7/1997 | Conemac |
| 5,648,181 A | 7/1997 | Watanabe |
| 5,666,174 A | 9/1997 | Cupolo, III |
| 5,668,662 A | 9/1997 | Magocs et al. |
| 5,670,209 A | 9/1997 | Wyckoff |
| 5,684,552 A | 11/1997 | Miyamoto et al. |
| 5,698,857 A | 12/1997 | Lambert et al. |
| 5,715,021 A | 2/1998 | Gibeau et al. |
| 5,716,118 A | 2/1998 | Sato et al. |
| 5,870,224 A | 2/1999 | Saitoh et al. |
| 5,882,774 A | 3/1999 | Jonza et al. |
| 5,907,312 A | 5/1999 | Sato et al. |
| 5,920,361 A | 7/1999 | Gibeau et al. |
| 5,959,296 A | 9/1999 | Cyr et al. |
| 5,973,813 A | 10/1999 | Takeuchi |
| 5,976,424 A | 11/1999 | Weber et al. |
| 5,978,142 A | 11/1999 | Blackham et al. |
| 5,994,722 A | 11/1999 | Averbeck et al. |
| 5,998,918 A | 12/1999 | Do et al. |
| 5,998,925 A | 12/1999 | Shimizu et al. |
| 6,008,925 A | 12/1999 | Conemac |
| 6,010,751 A | 1/2000 | Shaw et al. |
| 6,057,953 A | 5/2000 | Ang |
| 6,064,417 A | 5/2000 | Harrigan et al. |
| 6,066,861 A | 5/2000 | Hohn et al. |
| 6,069,599 A * | 5/2000 | Py et al. .................... 345/74.1 |
| 6,080,467 A | 6/2000 | Weber et al. |
| 6,088,163 A | 7/2000 | Gilbert et al. |
| 6,101,032 A | 8/2000 | Wortman et al. |
| 6,117,530 A | 9/2000 | Jonza et al. |
| 6,118,516 A | 9/2000 | Irie et al. |
| 6,128,131 A | 10/2000 | Tang |
| 6,134,050 A | 10/2000 | Conemac |
| 6,154,259 A | 11/2000 | Hargis et al. |
| 6,157,490 A | 12/2000 | Wheatley et al. |
| 6,172,810 B1 | 1/2001 | Fleming et al. |
| 6,175,440 B1 | 1/2001 | Conemac |
| 6,219,168 B1 | 4/2001 | Wang |
| 6,224,216 B1 | 5/2001 | Parker |
| 6,226,126 B1 | 5/2001 | Conemac |
| 6,252,254 B1 | 6/2001 | Soules et al. |
| 6,255,670 B1 | 7/2001 | Srivastava et al. |
| 6,276,802 B1 | 8/2001 | Naito |
| 6,288,817 B2 | 9/2001 | Rowe |
| 6,329,966 B1 | 12/2001 | Someya et al. |
| 6,333,724 B1 | 12/2001 | Taira et al. |
| 6,417,019 B1 | 7/2002 | Mueller et al. |
| 6,429,583 B1 | 8/2002 | Levinson et al. |
| 6,429,584 B2 | 8/2002 | Kubota |
| 6,463,585 B1 | 10/2002 | Hendricks et al. |
| 6,531,230 B1 | 3/2003 | Weber et al. |
| 6,576,156 B1 | 6/2003 | Ratna et al. |
| 6,621,593 B1 | 9/2003 | Wang et al. |
| 6,621,609 B1 | 9/2003 | Conemac |
| 6,627,060 B1 | 9/2003 | Yum et al. |
| 6,628,248 B2 | 9/2003 | Masumoto et al. |
| 6,678,081 B2 | 1/2004 | Nishihata et al. |
| 6,717,704 B2 | 4/2004 | Nakai |
| 6,765,237 B1 | 7/2004 | Doxsee et al. |
| 6,777,861 B2 | 8/2004 | Russ et al. |
| 6,809,347 B2 | 10/2004 | Tasch et al. |
| 6,809,781 B2 | 10/2004 | Setlur et al. |
| 6,839,042 B2 | 1/2005 | Conemac et al. |
| 6,853,131 B2 | 2/2005 | Srivastava et al. |
| 6,900,916 B2 | 5/2005 | Okazaki et al. |
| 6,905,220 B2 | 6/2005 | Wortman et al. |
| 6,937,221 B2 | 8/2005 | Lippert et al. |
| 6,937,383 B2 | 8/2005 | Morikawa et al. |
| 6,947,198 B2 | 9/2005 | Morikawa et al. |
| 6,986,581 B2 | 1/2006 | Sun et al. |
| 6,987,610 B2 | 1/2006 | Piehl |
| 7,068,406 B2 | 6/2006 | Shimomura |
| 7,088,335 B2 | 8/2006 | Hunter et al. |
| 7,090,355 B2 | 8/2006 | Liu et al. |
| 7,147,802 B2 | 12/2006 | Sugimoto et al. |
| 7,181,417 B1 | 2/2007 | Langseth et al. |
| 7,213,923 B2 | 5/2007 | Liu et al. |
| 7,230,767 B2 | 6/2007 | Walck et al. |
| 7,239,436 B2 | 7/2007 | Orttinger et al. |
| 7,283,301 B2 | 10/2007 | Peeters et al. |
| 7,302,174 B2 | 11/2007 | Tan et al. |
| 7,474,286 B2 | 1/2009 | Hajjar et al. |
| 2001/0019240 A1 | 9/2001 | Takahashi |
| 2001/0024086 A1 | 9/2001 | Fox et al. |
| 2001/0050371 A1 | 12/2001 | Odaki et al. |
| 2002/0003233 A1 | 1/2002 | Mueller-Mach et al. |
| 2002/0008854 A1 | 1/2002 | Leigh Travis |
| 2002/0024495 A1 | 2/2002 | Lippert et al. |
| 2002/0050963 A1 | 5/2002 | Conemac et al. |
| 2002/0122260 A1 | 9/2002 | Okazaki et al. |
| 2002/0124250 A1 | 9/2002 | Proehl et al. |
| 2002/0145685 A1 | 10/2002 | Mueller-Mach et al. |
| 2002/0163702 A1 | 11/2002 | Hori et al. |
| 2002/0185965 A1 | 12/2002 | Collins et al. |
| 2003/0015692 A1 | 1/2003 | Teng et al. |
| 2003/0094893 A1 | 5/2003 | Ellens et al. |
| 2003/0184209 A1 | 10/2003 | Russ et al. |
| 2003/0184531 A1 | 10/2003 | Morikawa et al. |
| 2003/0184613 A1 | 10/2003 | Nakamura et al. |
| 2003/0184842 A1 | 10/2003 | Morikawa et al. |
| 2004/0027465 A1 | 2/2004 | Smith et al. |
| 2004/0070551 A1 | 4/2004 | Walck et al. |
| 2004/0141220 A1 * | 7/2004 | Hama et al. ................. 359/204 |
| 2004/0145312 A1 | 7/2004 | Ouderkirk et al. |
| 2004/0156079 A1 | 8/2004 | Marshall et al. |
| 2004/0160516 A1 | 8/2004 | Ford |
| 2004/0165642 A1 | 8/2004 | Lamont |
| 2004/0184123 A1 | 9/2004 | Moikawa et al. |
| 2004/0223100 A1 | 11/2004 | Kotchick et al. |

| | | |
|---|---|---|
| 2004/0227465 A1 | 11/2004 | Menkara et al. |
| 2004/0263074 A1 | 12/2004 | Baroky et al. |
| 2005/0001225 A1 | 1/2005 | Yoshimura et al. |
| 2005/0012446 A1 | 1/2005 | Jermann et al. |
| 2005/0023962 A1 | 2/2005 | Menkara et al. |
| 2005/0023963 A1 | 2/2005 | Menkara et al. |
| 2005/0051790 A1 | 3/2005 | Ueda |
| 2005/0093818 A1 | 5/2005 | Hatam-Tabrizi et al. |
| 2005/0094266 A1 | 5/2005 | Liu et al. |
| 2006/0050015 A1 | 3/2006 | Kusunoki et al. |
| 2006/0066508 A1 | 3/2006 | Walck et al. |
| 2006/0081793 A1 | 4/2006 | Nesterovic et al. |
| 2006/0082873 A1 | 4/2006 | Allen et al. |
| 2006/0088951 A1 | 4/2006 | Hayashi et al. |
| 2006/0132021 A1 | 6/2006 | Naberhuis et al. |
| 2006/0139580 A1 | 6/2006 | Conner |
| 2006/0197922 A1 | 9/2006 | Liu et al. |
| 2006/0221021 A1 | 10/2006 | Hajjar et al. |
| 2006/0221022 A1 | 10/2006 | Hajjar |
| 2006/0227087 A1 | 10/2006 | Hajjar et al. |
| 2006/0262243 A1 | 11/2006 | Lester et al. |
| 2006/0266958 A1 | 11/2006 | Shimizu et al. |
| 2006/0290898 A1 | 12/2006 | Liu et al. |
| 2007/0014318 A1 | 1/2007 | Hajjar et al. |
| 2007/0183466 A1 | 8/2007 | Son et al. |
| 2007/0187580 A1 | 8/2007 | Kykta et al. |
| 2007/0187616 A1 | 8/2007 | Burroughs et al. |
| 2007/0188417 A1 | 8/2007 | Hajjar et al. |
| 2007/0206258 A1 | 9/2007 | Malyak et al. |
| 2007/0228927 A1 | 10/2007 | Kindler et al. |
| 2007/0229946 A1 | 10/2007 | Okada et al. |
| 2008/0018558 A1 | 1/2008 | Kykta et al. |
| 2008/0066107 A1 | 3/2008 | Moonka et al. |
| 2008/0068295 A1 | 3/2008 | Hajjar |
| 2008/0235749 A1 | 9/2008 | Jain et al. |
| 2008/0291140 A1 | 11/2008 | Kent et al. |
| 2009/0001272 A1 | 1/2009 | Hajjar |
| 2009/0116107 A1 | 5/2009 | Kindler et al. |
| 2009/0153582 A1 | 6/2009 | Hajjar et al. |
| 2009/0174632 A1 | 7/2009 | Hajjar et al. |

FOREIGN PATENT DOCUMENTS

| | | |
|---|---|---|
| EP | 0196862 | 10/1986 |
| EP | 0271650 | 6/1988 |
| EP | 1150361 | 10/2001 |
| JP | 56164826 | 12/1981 |
| JP | 59-155826 | 9/1984 |
| JP | 02-157790 | 6/1990 |
| JP | 2-199975 | 8/1990 |
| JP | 5232583 | 9/1993 |
| JP | 6-46461 | 2/1994 |
| JP | 2000-49380 | 2/2000 |
| JP | 2001-210122 | 8/2001 |
| JP | 2001-316664 | 11/2001 |
| JP | 2002-83549 | 3/2002 |
| JP | 2006-323391 | 11/2006 |
| KR | 10-2001-0097415 | 11/2001 |
| KR | 2002-0024425 | 3/2002 |
| KR | 2003-0068589 | 8/2003 |
| WO | WO 90/12387 | 10/1990 |
| WO | WO 92/22109 | 12/1992 |
| WO | WO 00/20912 | 4/2000 |
| WO | WO 00/33389 | 6/2000 |
| WO | WO 01/24229 | 4/2001 |
| WO | WO 01/88609 | 11/2001 |
| WO | WO 02/11173 | 2/2002 |
| WO | WO 02/23962 | 3/2002 |
| WO | WO 02/33970 | 4/2002 |
| WO | WO 02/057838 | 7/2002 |
| WO | WO 02/071148 | 9/2002 |
| WO | WO 2005/119797 | 12/2005 |
| WO | WO 2006/097876 | 9/2006 |
| WO | WO 2006/107720 | 10/2006 |
| WO | WO 2007/050662 | 5/2007 |
| WO | WO 2007/095329 | 8/2007 |
| WO | WO 2007/114918 | 10/2007 |
| WO | WO 2007/131195 | 11/2007 |
| WO | WO 2007/134329 | 11/2007 |
| WO | WO 2008/116123 | 9/2008 |
| WO | WO 2008/124707 | 10/2008 |
| WO | WO 2008/144673 | 11/2008 |
| WO | WO 2009/003192 | 12/2008 |

OTHER PUBLICATIONS

"Quantum Dots Explained," http://www.evidenttech.com/quantum-dots-explained.html (1 page) [accessed May 27, 2008].

"Reflection and retroreflection," Delta Technical Note—RS 101 http://www.delta.dk/C1256ED600446B80/sysOakFil/roadsensors%20techn%20info%20RS101/$File/RS101.pdf, revised: Jul. 10, 2004, 7 pages [accessed Oct. 23, 2008].

Collins et al., "Process Control of the Chlorobenzene Single-Step Liftoff Process with a Diazo-Type Resist," IBM J. Res. Develop. 26(5): 596-604 (Sep. 1982).

Cusano, D.A., "Cathodo-, Photo-, and D.C. -Electroluminescence in Zinc Sulfide Layers," Luminescence of Organic and Inorganic Materials, Kallman, H.P. and G.M. Spruch (Eds.), New York University, pp. 494-522 (1962).

Daud, A. et al., "Transparent Y2O2S:Eu3+ phosphor thin films grown by reactive evaporation and their luminescent properties," Journal of the Society for Information Display (SID), vol. 4, No. 3, pp. 193-196 (1996).

Donofrio, R.L. and C.H. Rehkopf, "Screen Weight Optimization," Journal of the Electrochemical Society, vol. 126, No. 9, pp. 1563-1567 (Sep. 1979).

Greer, J.A. et al., "38.4: P-53 Thin Film Phosphors Prepared by Pulsed—Laser Deposition," 1994 SID International Symposium Digest of Technical Papers (SID '94 Digest) vol. XXV, pp. 827-830 (May 1994).

Hopkinson, R. G., "An Examination of Cathode-Ray-Tube Characteristics," The Journal of the Institute of Electrical Engineers, vol. 93, Part IIIa (Radiolocation), No. 5, pp. 779-794 (1946).

International Search Report and Written Opinion dated Aug. 29, 2008, for PCT/US2008/059603, filed Apr. 7, 2008, entitled: "Post-Objective Scanning Beam Systems".

International Search Report and Written Opinion dated Jul. 20, 2006 and International Preliminary Report on Patentability for dated Oct. 3, 2007 for PCT/US2006/11757, now WO 2006/107720, published on Oct. 12, 2006, entitled: "Display Systems and Devices Having Screens with Optical Fluorescent Materials".

International Search Report and Written Opinion dated Jun. 27, 2008 for PCT/US2008/057763, filed Mar. 20, 2008, entitled: "Delivering and Displaying Advertisement or Other Application Data to Display Systems".

International Search Report and Written Opinion dated Mar. 13, 2008 and International Preliminary Report on Patentability for dated Aug. 19, 2008 for PCT/US2007/004004, now WO 2007/095329, published on Aug. 23, 2007, entitled: "Servo-Assisted Scanning Beam Display Systems Using Fluorescent Screens".

International Search Report and Written Opinion dated May 28, 2008 for PCT/US06/41584, now WO 2007/050662, published on May 3, 2007, entitled: "Optical Designs for Scanning Beam Display Systems Using Fluorescent Screens," 9 pages.

Kalkhoran, N.M. et al., "LP-E: *Late News Poster*: Luminescence Study of Ion-Implanted ZnGa2O4 Thin Films on Flexible Organic Substrates," 1997 SID International Symposium Digest of Technical Papers (SID '97 Digest), vol. XXVIII, pp. 623-626 (May 1997).

Kim, J.M. et al. "6.3: Development of 4-in. Full Color FED, Devices," 1997 SID International Symposium Digest of Technical Papers ( SID '97 Digest), vol. XVIII, pp. 56-59 (May 1997).

Kramer, C.J., "Hologon deflectors for graphic arts applications: an overview," SPIE Proceedings on Beam Deflection and Scanning Technologies 1454: 68-100 (1991).

Kramer, C.J., "Hologon deflectors incorporating dispersive optical elements for scan line bow correction," SPIE Proceedings on Holographic Optics: Design and Applications, 883: 230-244 (1988).

Loewen, E.G. et al., "Grating efficiency theory as it applies to blazed and holographic gratings," Applied Optics, vol. 16, No. 10, p. 2711-2721 (Oct. 1977).

McDonald, L. W. and A. C. Lowe (Eds.), *Display Systems, Design Applications*, John Wiley & Sons: Chichester, England, pp. 195-196 (1997).

Mezner, L.Z. et al., "P-23: Centrifugal Settling of High Resolution 1-in CRT Screens," 1994 SID International Symposium Digest of Technical Papers (SID '94 Digest), vol. XXV, pp. 520-522 (May 1994).

Morikawa, M. et al., "S11-3 Study to Improve the Flood-Beam CRT for Giant Screen Display," Proceedings of the Twelfth International Display Research Conference, Japan Display '92, Oct. 12-14, 1992, International Conference Center, Hiroshima, Japan pp. 385-388.

Mueller-Mach, R. et al., "High-Power Phosphor-Converted Light Emitting Diodes Based on III-Nitrides," IEEE Journal on Selected Topics in Quantum Electronics 8(2): 339-345 (Mar./Apr. 2002).

Nonogaki, S. et al., "Dry Process for Phosphor Screen Fabrication of Multicolored Cathode Ray Tubes," Research & Development in Japan, pp. 50-55 (1984).

Oki, K. and L. Ozawa, "A phosphor screen for high-resolution CRTs," Journal of the SID, vol. 3, No. 2, pp. 51-57 (Sep. 1995).

Pringsheim, P. and M. Vogel, *Luminescence of Liquids and Solids and its Practical Applications*, Interscience Publishers, Inc.: New York, N.Y., pp. 144-145 (1946).

Rowe, D.M., "Developments in holographic-based scanner designs," Proc. SPIE Optical Scanning Systems: Design and Applications, Leo Beiser and Stephen F. Sagan, Eds. vol. 3131: 52-58 (1997).

Rynearson, R.L. et al., "Low-cost, mechanically rigid, high-aspect-ratio mirrors," SPIE Proceedings on Design, Fabrication, and Applications of Precision Plastic Optics 2600: 137-143 (1995).

Schermerhorn, J.D. et al., "15.5: A Grooved Structure for a Large High-Resolution Color ACPDP," 1997 SID International Symposium Digest of Technical Papers ( SID '97 Digest), vol. XVII, pp. 229-232 (May 1997).

Schlesinger et al., "Screening," Design, Development, and Fabrication of Ultra-High-Resolution Cathode Ray tube. Technical Report ECOM-00476, pp. 64-72, Feb. 1969.

Smith, D.C. et. al., "32.5: Late-News Paper: Crystalline-As-Deposited CaGa2S4:Ce via Low Temperature Metal Organic Chemical Vapor Deposition," 1995 SID International Symposium Digest of Technical Papers (SID '95 Digest), vol. XXVI, pp. 728-731 (May 1995).

Smith, W.J., "Scanner/f-0 and Laser Disk Collimator Lenses," Chapter 22 in Modern Lens Design: A Resource Manual, pp. 411-430, Boston, Mass.: McGraw-Hill, Inc., 1992.

Withnall et al., "Studies of UV stimulated luminesence from phosphors of commerical importance," Central Laser Facility Annual Report 2004/2005 http://www.clf.rl.ac.uk/Reports/2004-2005/pdf/64.pdf [accessed on May 23, 2008], 2 pages.

Yocom, P. N., "Future requirements of display phosphors from an historical perspective," Journal of the Society for Information Display (SID), Special Section: Papers from the First International Conference on the Science and Technology of Display Phosphors, vol. 4, No. 3, pp. 149-152 (Oct. 1996).

Yocom, P. N., "New green phosphors for plasma displays," Journal of the Society for Information Display (SID), Special Section: Papers from the First International Conference on the Science and Technology of Display Phosphors, vol. 4, No. 3, pp. 169-172 (Oct. 1996).

Županc-Mežnar, L. And M. Žumer, "26.4:Preparation of P43 Suspension and Screen-Quality Evaluation in 1—in. CRTs", 1997 SID International Symposium Digest of Technical Papers ( SID '97 Digest), vol. XVIII, pp. 440-443 (May 1997).

European Examiner Giancarlo Tomezzoli, Supplementary European Search Report dated Jul. 29, 2009 for European Patent Application No. 06836510.5 (6 pages).

European Examiner Giancarlo Tomezzoli, Supplementary European Search Report dated Mar. 25, 2009 for European Patent Application No. 06740108.3 (7 pages).

The Korean Intellectual Property Office, Office Action dated Mar. 31, 2009 for Korean Patent Application No. 10-2007-7025455 (4 pages).

English language translation of The Korean Intellectual Property Office, Office Action dated Mar. 31, 2009 for Korean Patent Application No. 10-2007-7025455 (5 pages).

International Search Report and Written Opinion dated Nov. 24, 2008 for PCT/US07/68989, now WO 2007/134329, published on Nov. 22, 2007 and entitled: "Multilayered Fluorescent Screens for Scanning Beam Display Systems" 9 pages.

International Search Report and Written Opinion dated Nov. 28, 2008 for PCT/US2008/064169, now WO 2008/144673, published on Nov. 27, 2007 and entitled: "Multilayered Screens with Light-Emitting Stripes for Scanning Beam Display Systems" 9 pages.

International Search Report and Written Opinion dated Nov. 26, 2008 for PCT/US2008/068679, now WO 2009/003192, published on Dec. 31, 2008 and entitled: "Servo Feedback Control Based on Designated Scanning Servo Beam in Scanning Beam Display Systems With Light-Emitting Screens" 11 pages.

* cited by examiner

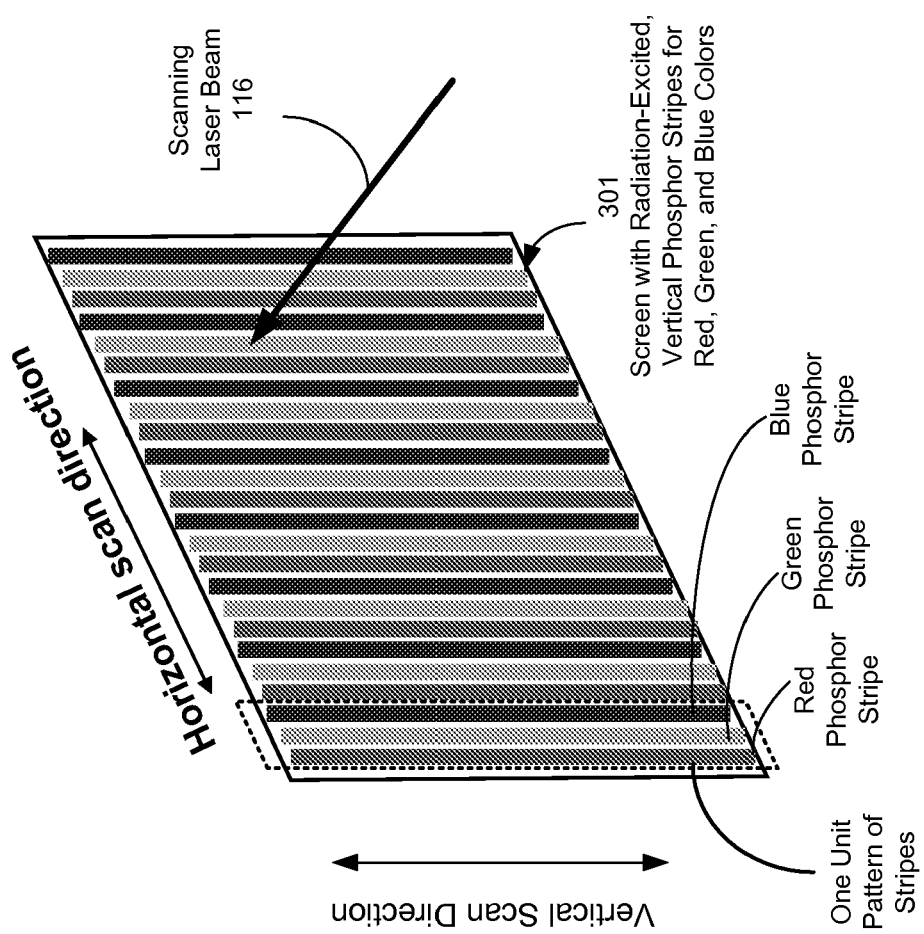

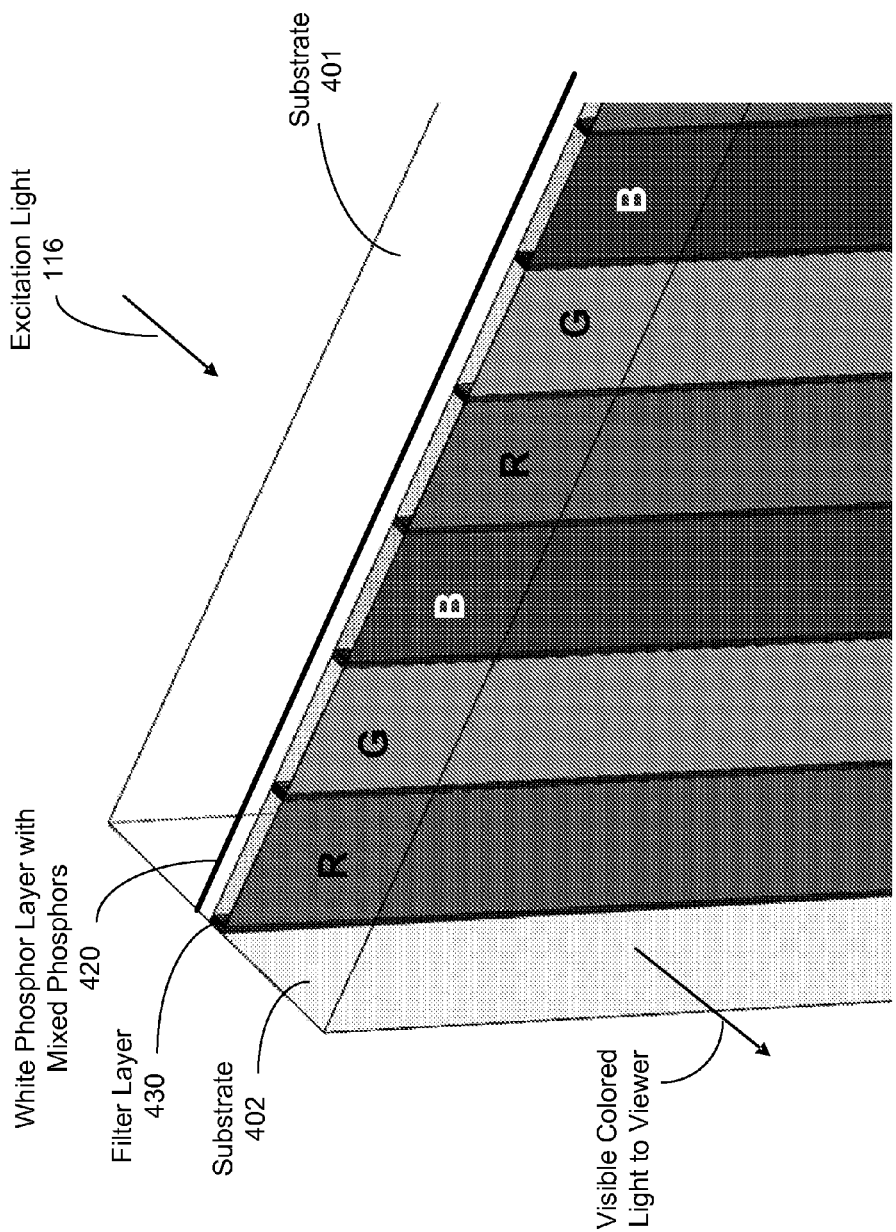

POST-OBJECTIVE SCANNING BEAM SYSTEMS

This application claims the benefit of U.S. provisional application No. 60/910,644 entitled POST-OBJECTIVE SCANNING BEAM SYSTEMS" and filed on Apr. 6, 2007, the entire disclosure of which is incorporated by reference as part of the specification of this application.

BACKGROUND

This application relates to scanning-beam systems for producing optical patterns in various applications.

Scanning beam systems can be used to project one or more scanned beams on a surface to produce optical patterns. Many laser printing systems use a scanning laser beam to print on a printing surface of a printing medium (e.g., paper). Some display systems use 2-dimensionally scanned light to produce images on a screen.

As an example, many display systems such as laser display systems use a polygon scanner with multiple reflective facets to provide horizontal scanning and a vertical scanning mirror such as a galvo-driven mirror to provide vertical scanning. In operation, one facet of the polygon scanner scans one horizontal line as the polygon scanner spins to change the orientation and position of the facet and the next facet scans the next horizontal line. The horizontal scanning and the vertical scanning are synchronized to each other to project images on the screen.

Some scanning-beam systems such as scanning-beam display systems use a pre-objective optical design where a scan lens is placed in the optical path downstream from the polygon scanner and the vertical scanner to focus a scanning beam onto a target surface, e.g., a screen. Because the scan lens is positioned downstream from the polygon scanner and the vertical scanner, the beam entering the scan lens is scanned along the vertical and horizontal directions. Therefore, the scan lens is designed to focus the 2-dimensionally scanned beam onto the target surface.

SUMMARY

The specification of this application describes, among others, scanning beam systems, apparatus and techniques in optical post-objective designs with two beam scanners for display and other applications.

In one implementation, a scanning beam system includes a light source operable to produce a beam of light; a first beam scanner to scan the beam of light along a first direction; a second beam scanner to scan the beam of light received from the first beam scanner along a second direction different from the first direction; and a scan lens placed in an optical path of the beam of light between the first and the second beam scanners to direct the beam of light from the first beam scanner along a line on the second beam scanner and to focus the beam of light onto a surface away from the second beam scanner. The system may include a beam focusing element placed in an optical path of the beam of light to adjust a focus of the beam of light; and an actuator coupled to the beam focusing element to adjust a position of the beam focusing element, in response to a control signal, to adjust the focus in synchronization with scanning of the second beam scanner.

In another implementation, a scanning beam system includes an optical module operable to produce a scanning beam of excitation light having optical pulses that can be used to carry image information; and a fluorescent screen which absorbs the excitation light and emits visible fluorescent light to produce images carried by the scanning beam. The optical module includes a light source to produce the beam of excitation light; a horizontal polygon scanner to scan the beam of excitation light along a first direction; a vertical scanner to scan the beam of excitation light from the polygon along a second direction different from the first direction; and a 1-dimensional scan lens placed between the polygon scanner and the vertical scanner to direct the beam of excitation light from the polygon scanner along a line on the vertical scanner and to focus the beam of excitation light onto the screen.

In another implementation, a scanning beam system includes a light source to produce a beam of light having optical pulses that carry image information; a horizontal polygon scanner to scan the beam along a first direction at a first scanning rate; a vertical scanner to scan the beam from the polygon along a second direction different from the first direction at a second scanning rate less than the first scanning rate; a 1-dimension scan lens placed between the polygon scanner and the vertical scanner to direct the beam from the polygon scanner along a line on the vertical scanner and to focus the beam onto a reference surface; a beam focusing element placed between the light source and the horizontal polygon scanner to adjust a focus of the beam on the reference surface; and an actuator coupled to the beam focusing element to adjust a position of the beam focusing element, in response to a control signal, to adjust the focus in synchronization with a scanning position of the vertical scanner.

In yet another implementation, a method for scanning a beam along two directions on a target surface includes scanning the beam with a first scanner to scan the beam along a first direction at a first scanning rate; directing the beam out of the first scanner into a second scanner to scan the beam along a second direction different from the first direction at a second scanning rate less than the first scanning rate; using a 1-dimension scan lens placed between the first and the second scanners to focus the beam onto the target surface; and controlling a focus of the beam in synchronization with a scanning position of the second scanner to control focusing of the beam on the target surface.

These and other implementations are described in detail in the drawings, the detailed description and the claims.

BRIEF DESCRIPTION OF THE DRAWINGS

FIG. 3A illustrates an example of a fluorescent screen having color phosphor stripes that can be used in a post-objective scanning beam display system.

FIG. 4 shows another exemplary design of the screen in FIG. 3A.

DETAILED DESCRIPTION

Examples of post-objective scanning-beam systems described in this application use a vertical scanner with an optical reflector and a spinning horizontal polygon scanner with reflective facets to provide the 2-dimensional scanning of one or more scanning beams onto a target screen. A beam can be first directed to a first scanner of the vertical scanner and the polygon scanner to scan along a first direction and then directed through a scan lens located between the vertical scanner and the polygon scanner. After exiting the scan lens, the beam is scanned along the first direction and is directed to the second scanner of the vertical scanner and the polygon scanner to scan along a second, different direction (e.g., orthogonal to the first direction). The output of the second scanner is a scanning beam that is scanned along both the first and the second directions.

Figure 1:
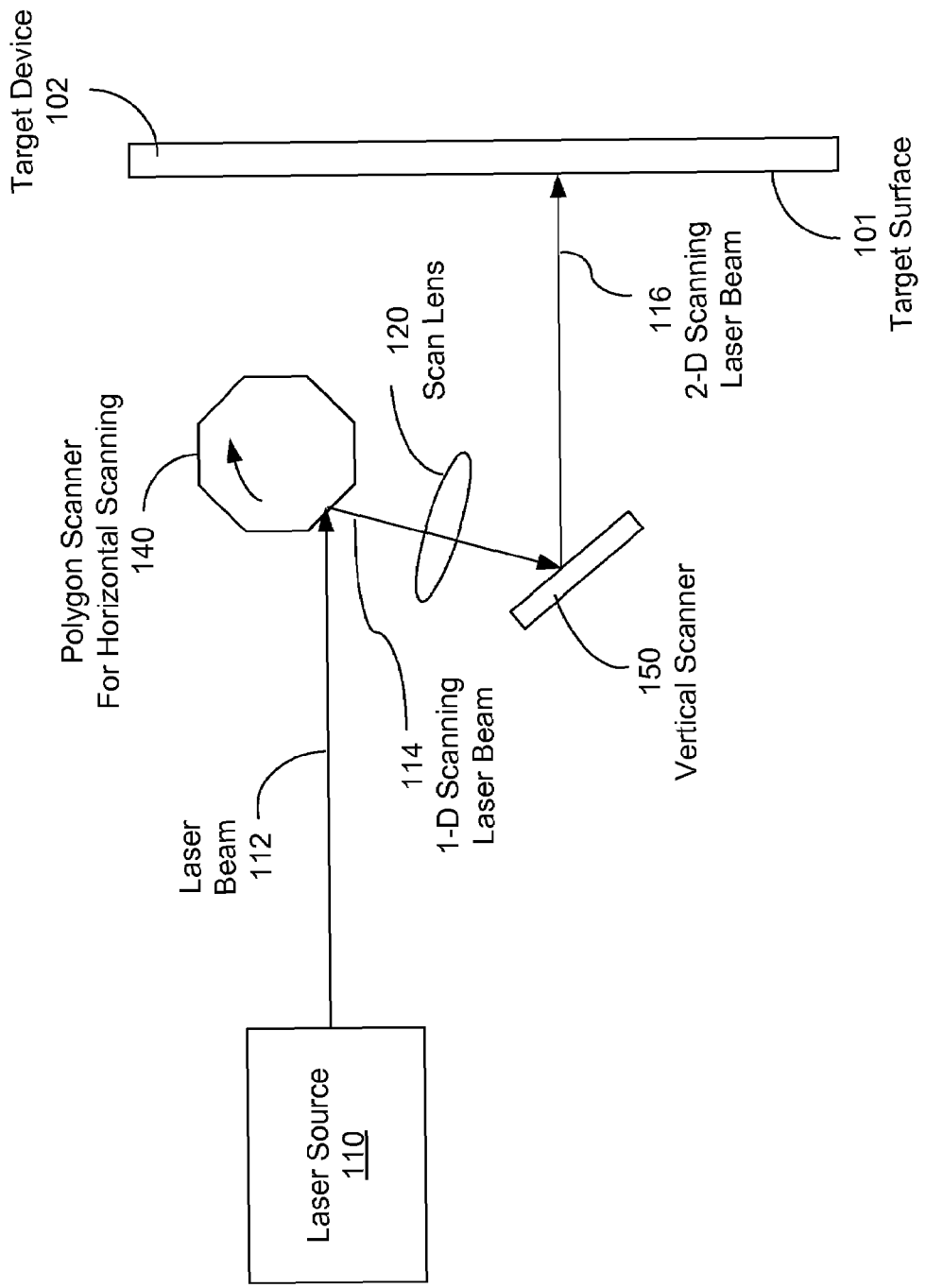
FIG. 1 shows an example implementation of a post-objective scanning system.

FIG. 1 shows an example implementation of a post-objective scanning system. A laser source 110 is provided to produce at least one laser beam 112. Depending on the specific applications, this single beam can be a beam of a particular wavelength, e.g., a visible color, UV light or other wavelengths. In some applications, multiple beams 112 may be generated from the laser source 110 and are scanned. The different beams 112 may be of different wavelengths, e.g., red, green and blue colors in the visible range, or of the same or similar wavelengths, e.g., UV light. In this example, the first scanner of the two scanners is a polygon scanner 140. The beam 112 is scanned along the first direction (e.g., the horizontal direction) by the polygon scanner 140 as a 1-D scanning beam 114. The second scanner downstream from the polygon scanner 140 is a vertical scanner 150, e.g., a galvo mirror constructed by engaging a mirror to a galvanometer and operates to scan the horizontally scanning beam 114 along the vertical direction as a 2-D scanning beam 116 to a target surface 101, e.g., a screen. A scan lens 120 is placed between the two scanners 140 and 150.

In this post-objective design, the scan lens 120 can be structured to have high optical performance in focusing the 1-D scanning beam 114 along the scanning direction of the first scanner 140 only. Hence, such a scan lens does need to exhibit high optical performance along the second scanning direction (i.e., the vertical direction in this example) because the beam 114 is not scanned along the second scanning direction at the position of the scan lens 120. Therefore, the scan lens 120 can be a 1-D scan lens, e.g., a 1-D f theta lens. High-cost and complex 2-D lenses can be avoided in implementing the system of FIG. 1. Due to the design of the scan lens 120, the focusing of the beam 116 on the target surface 101 does not change with the horizontal scanning.

In another aspect, the vertical scanner 150 in FIG. 1 scans at a much smaller rate as the second scanner than the scan rate of the first horizontal scanner 140 and thus a focusing variation caused by the vertical scanning on the target surface 101 varies with time at the slower vertical scanning rate. This allows a focusing adjustment mechanism to be implemented in the system of FIG. 1 with the lower limit of a response speed at the slower vertical scanning rate rather than the high horizontal scanning rate. In practical devices, this particular arrangement of two scanners 140 and 150 allows easy implementation of the dynamic focusing adjustment to maintain the proper focusing of the 2-D scanning beam on the target surface as the vertical scanner 150 scans along the vertical direction.

The target surface 101 in FIG. 1 is a surface of a target device 102. The device 102 can be in various forms depending on the applications of the system in FIG. 1. For example, in display applications, the target device 102 can be a screen on which images carried by the scanning beam 116 are displayed in a way visible to a viewer. The beam 112 incident to the first scanner 140 is optically modulated to carry the images to be displayed on the screen 102.

Figure 2A:
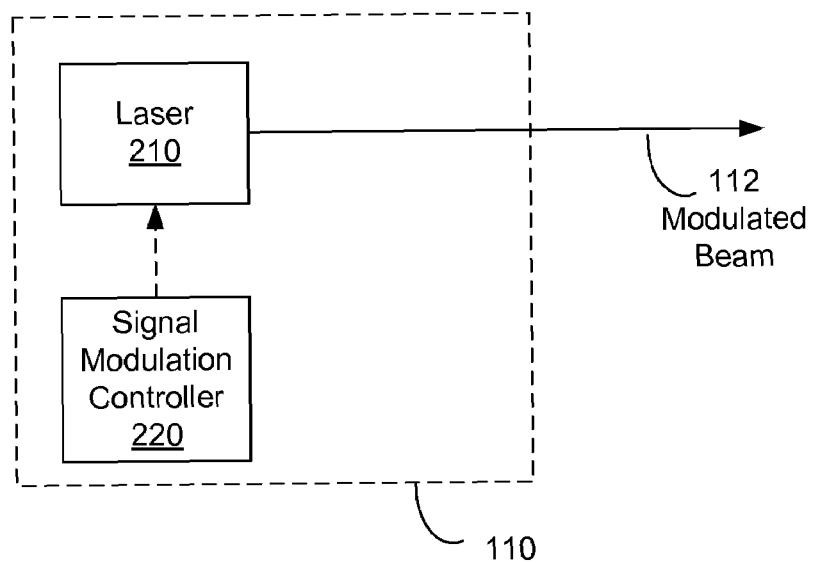
FIGS. 2A and 2B show two examples of a laser source for modulating information onto a scanning beam in the system of FIG. 1.
Figure 2B:
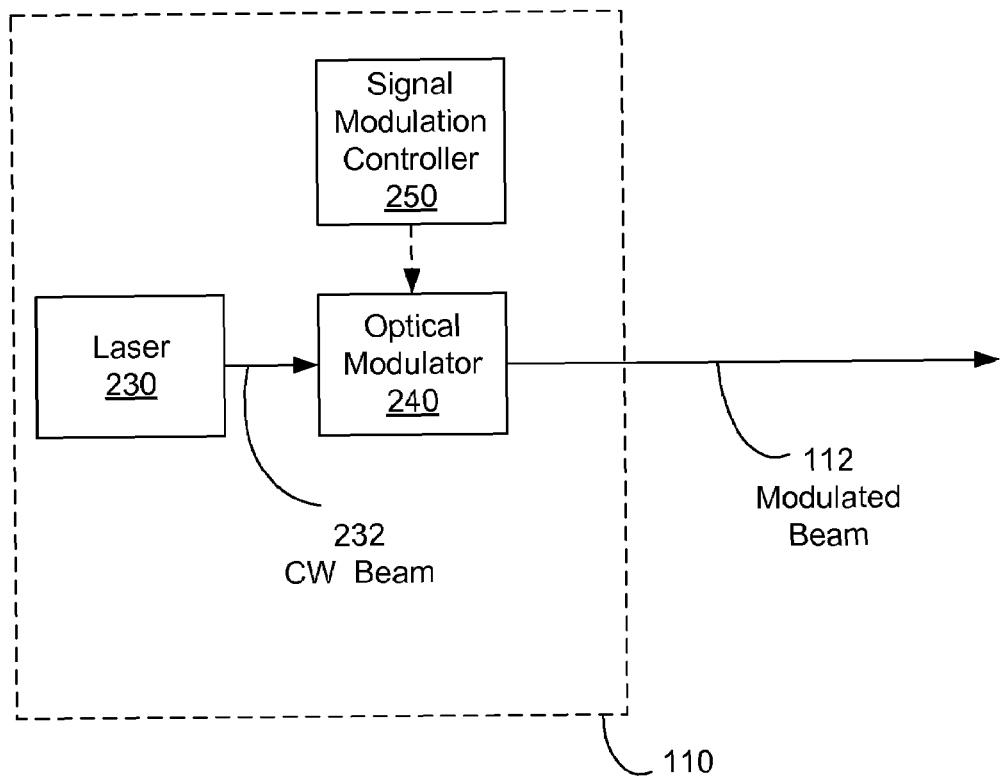

FIGS. 2A and 2B show two optical modulation designs that can be used to modulate the beam 112 to carry images or other information. In FIG. 2A, a laser 210 such as a diode laser is directly modulated to produce a modulated beam 112 that carries the image signals, e.g., color image data in red, green and blue. The laser source 110 in this implementation includes a signal modulation controller 220 which modulates the laser 210 directly. For example, the signal modulation controller 220 can control the driving current of a laser diode as the laser 210. In FIG. 2B, a laser 230 is used to generate a CW unmodulated laser beam 232 and an optical modulator 240 is used to modulate the CW laser beam 232 with the image signals in red, green and blue and to produce the modulated beam 112. A signal modulation controller 250 is used to control the optical modulator 240. For example, an acousto-optic modulator or an electro-optic modulator may be used as the optical modulator 240.

The screen 102 can be passive screens and active screens. A passive screen does not emit light but makes light of the one or more scanning beams visible to a viewer by one or a combination of mechanisms, such as optical reflection, optical diffusion, optical scattering and optical diffraction. For example, a passive screen can reflect or scatter received scanning beam(s) to show images.

An active screen emits light by absorbing the one or more scanning beams and the emitted light forms part of or all of the light that forms the displayed images. Such an active screen may include one or more fluorescent materials to emit light under optical excitation of the one or more scanning beams received by the screen to produce images. The term "a fluorescent material" is used here to cover both fluorescent materials and phosphorescent materials. Screens with phosphor materials under excitation of one or more scanning excitation laser beams are described here as specific implementation examples of optically excited fluorescent or phosphorescent materials in various systems.

Various screen designs with fluorescent materials can be used. Screens with phosphor materials under excitation of one or more scanning excitation laser beams are described in detail and are used as specific implementation examples of optically excited fluorescent materials in various system and device examples in this application. In one implementation, for example, three different color phosphors that are optically excitable by the laser beam to respectively produce light in red, green, and blue colors suitable for forming color images can be formed on the screen as repetitive red, green and blue phosphor stripes in parallel. Various examples described in this application use screens with parallel color phosphor stripes for emitting light in red, green, and blue to illustrate various features of the laser-based displays. Phosphor materials are one type of fluorescent materials. Various described systems, devices and features in the examples that use phosphors as the fluorescent materials are applicable to displays with screens made of other optically excitable, light-emitting, non-phosphor fluorescent materials.

For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

Some implementations of post-objective scanning beam display systems described here use at least one scanning laser beam to excite color light-emitting materials deposited on a screen to produce color images. The scanning laser beam is modulated to carry images in red, green and blue colors or in other visible colors and is controlled in such a way that the laser beam excites the color light-emitting materials in red, green and blue colors with images in red, green and blue colors, respectively. Hence, the scanning laser beam carries the images but does not directly produce the visible light seen by a viewer. Instead, the color light-emitting fluorescent materials on the screen absorb the energy of the scanning laser beam and emit visible light in red, green and blue or other colors to generate actual color images seen by the viewer.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range. The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, UV light or a UV laser beam is used as an example of the excitation light for a phosphor material or other fluorescent material and may be light at other wavelength.

FIG. 3A illustrates an example of a fluorescent screen 301 having color phosphor stripes. Alternatively, color phosphor dots may also be used to define the image pixels on the screen. The screen 301 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 3A as red, green and blue. Other color sequences may also be used. The laser beam 116 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green and blue light.

Figure 3B:
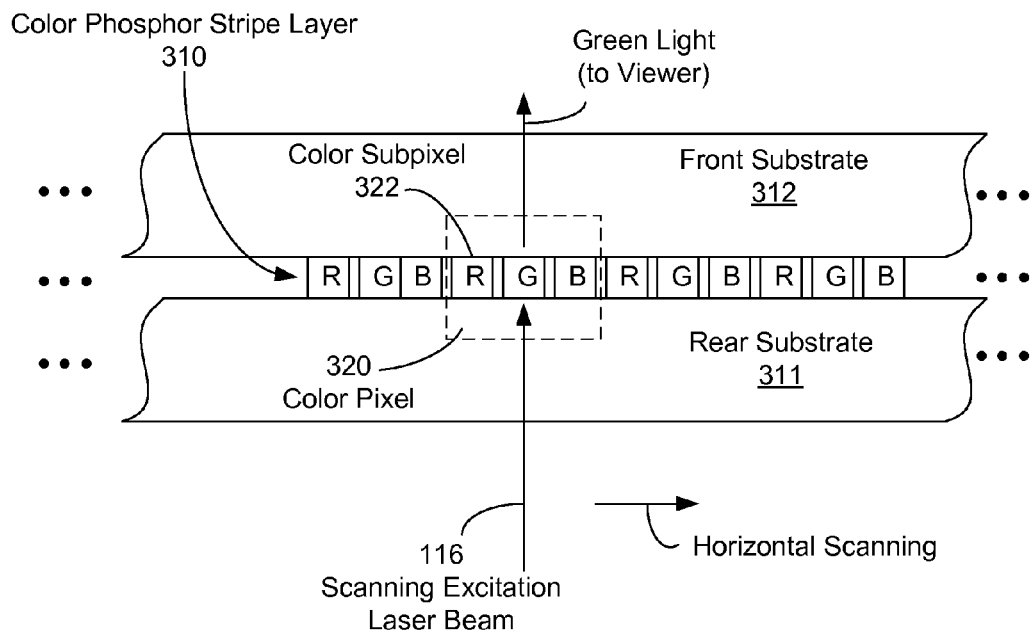
FIG. 3B shows an exemplary design of the screen in FIG. 3A.

FIG. 3B shows an exemplary design of the screen 301 in FIG. 3A. The screen 301 in this particular example includes a rear substrate 311 which is transparent to the scanning laser beam 116 to receive the scanning laser beam 116. A second front substrate 312 is fixed relative to the rear substrate 311 and faces the viewer so that the fluorescent light transmits through the substrate 312 towards the viewer. A color phosphor stripe layer 310 is placed between the substrates 311 and 312 and includes phosphor stripes. The color phosphor stripes for emitting red, green and blue colors are represented by "R", "G" and "B," respectively. The front substrate 312 is transparent to the red, green and blue colors emitted by the phosphor stripes. The substrates 311 and 312 may be made of various materials, including glass or plastic panels. Each color pixel includes portions of three adjacent color phosphor stripes in the horizontal direction and its vertical dimension is defined by the beam spread of the laser beam 116 in the vertical direction. As such, each color pixel includes three subpixels of three different colors (e.g., the red, green and blue). In the specific moment during the scan in FIG. 2A, the scanning laser beam 116 is directed at the green phosphor stripe within a pixel to produce green light for that pixel.

Figure 3C:
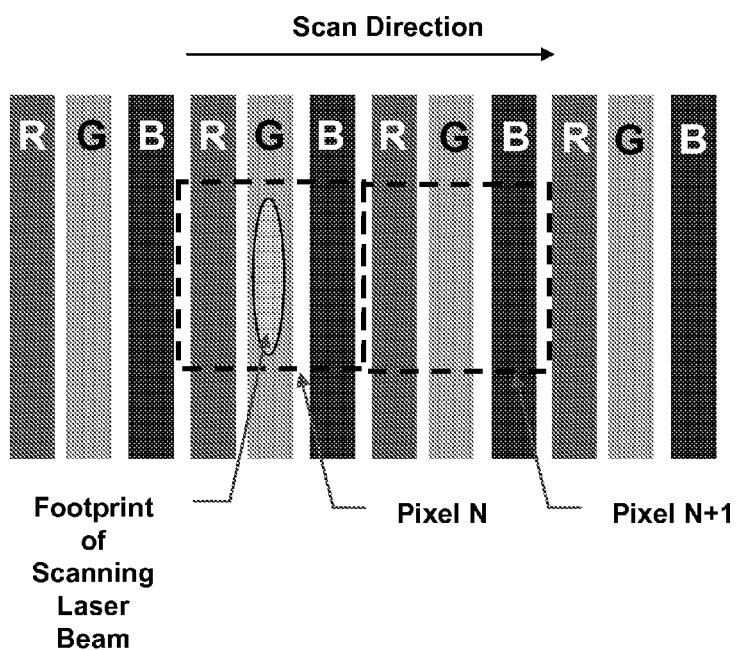
FIG. 3C shows the operation of the screen in a view along the direction perpendicular to the surface of the screen in FIG. 3A.

FIG. 3C further shows the operation of the screen 301 in a view along the direction perpendicular to the surface of the screen 301. Since each color stripe is longitudinal in shape, the cross section of the beam 116 may be shaped to be elongated along the direction of the stripe to maximize the fill factor of the beam within each color stripe for a pixel. This may be achieved by using a beam shaping optical element. A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Alternatively, FIG. 4 illustrates an example of a fluorescent screen design that has a contiguous and uniform layer 420 of mixed phosphors. This mixed phosphor layer 420 is designed and constructed to emit white light under optical excitation of the excitation light 116. The mixed phosphors in the mixed phosphor layer 420 can be designed in various ways and a number of compositions for the mixed phosphors that emit white light are known and documented. Notably, a layer 410 of color filters, such as stripes of red-transmitting, green-transmitting and blue-transmitting filters, is placed on the viewer side of the mixed phosphor layer 420 to filter the white light and to produce colored output light. The layers 410 and 420 can be sandwiched between substrates 401 and 402. The color filters may be implemented in various configurations, including in designs similar to the color filters used in color LCD panels. In each color filter region e.g., a red-transmitting filter, the filter transmits the red light and absorbs light of other colors including green light and blue light. Each filter in the layer 410 may be a multi-layer structure that effectuates a band-pass interference filter with a desired transmission band. Various designs and techniques may be used for designing and constructing such filters. U.S. Pat. No. 5,587,818 entitled "Three color LCD with a black matrix and red and/or blue filters on one substrate and with green filters and red and/or blue filters on the opposite substrate," and U.S. Pat. No. 5,684,552 entitled "Color liquid crystal display having a color filter composed of multilayer thin films," for example, describe red, green and blue filters that may be used in the screen design in FIG. 4. Hence, a fluorescent stripe in the fluorescent screen in various examples described in this application is a fluorescent stripe that emits a designated color under optical excitation and can be either a fluorescent stripe formed of a particular fluorescent material that emits the designated color in FIG. 3A or a combination of a stripe color filter and a white fluorescent layer in FIG. 4.

Figure 5:
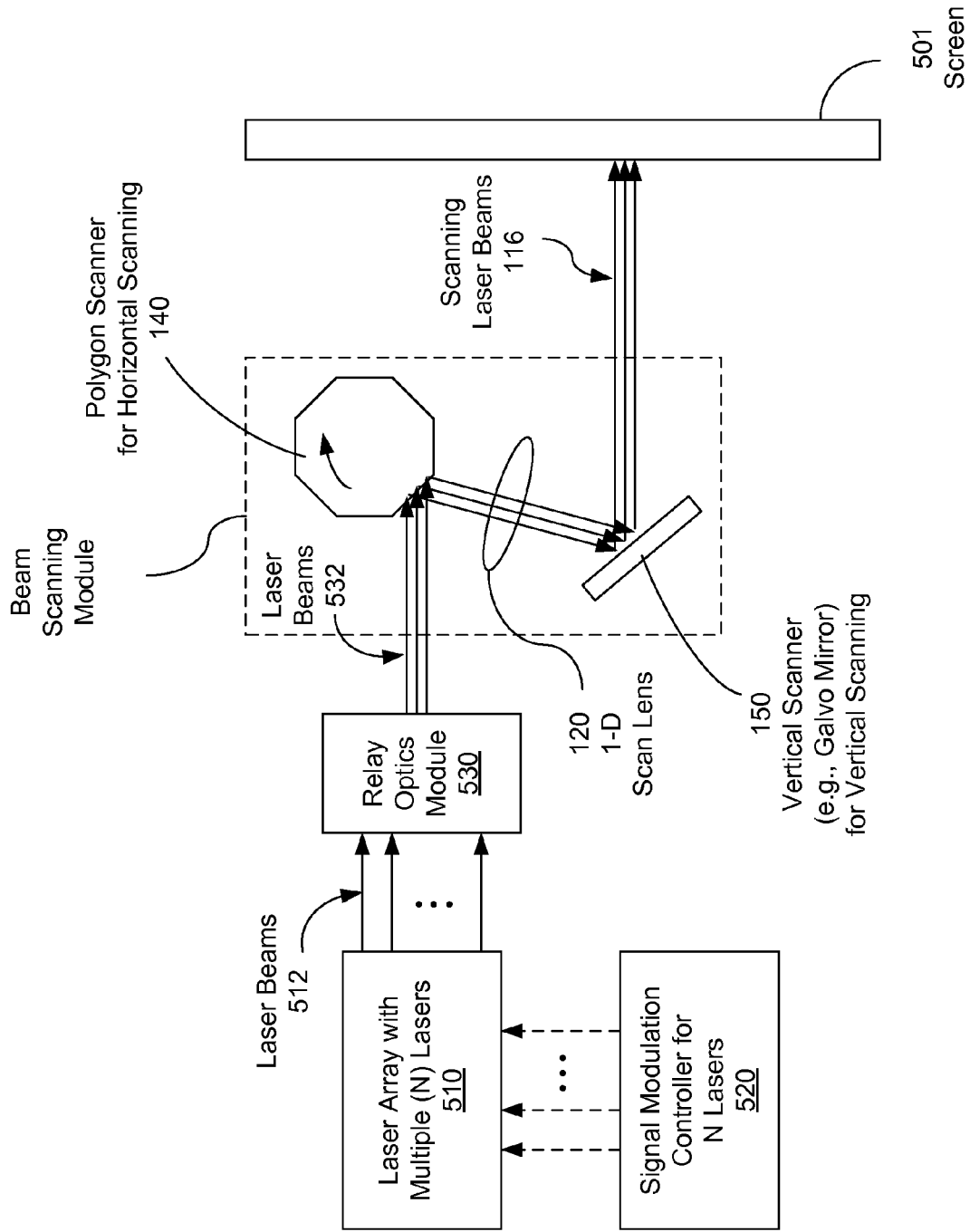
FIG. 5 shows an example of a post-objective scanning beam display system based on the system design in FIG. 1.

FIG. 5 shows an example implementation of a post-objective scanning beam display system based on the system design in FIG. 1. A laser array 510 with multiple lasers is used to generate multiple laser beams 512 to simultaneously scan a screen 501 for enhanced display brightness. The screen 501 can be a passive screen or an active screen. The laser array 510 can be implemented in various configurations, such as discrete laser diodes on separate chips arranged in an array and a monolithic laser array chip having integrated laser diodes arranged in an array. A signal modulation controller 520 is provided to control and modulate the lasers in the laser array 510 so that the laser beams 512 are modulated to carry the image to be displayed on the screen 501. The signal modulation controller 520 can include a digital image processor which generates the digital image signals for the three different color channels and laser driver circuits that produce laser control signals carrying the digital image signals. The laser control signals are then applied to modulate the lasers in the laser array 510, e.g., electric currents that drive the laser diodes. The laser beams 512 can be of different wavelengths (e.g., red, green and blue colors for a display with a passive screen 501) or of the same wavelength (e.g., either to increase the intensity of light to produce a monochromatic pattern on a passive surface 501 or an excitation light beam that excites phosphors on an active phosphor screen 501 in FIG. 3A).

The beam scanning is based on a two-scanner system in FIG. 1. Each of the different reflective facets of the polygon scanner 140 simultaneously scans N horizontal lines where N is the number of lasers. A relay optics module 530 reduces the spacing of laser beams 512 to form a compact set of laser beams 532 that spread within the facet dimension of the polygon scanner 140 for the horizontal scanning. Downstream from the polygon scanner 140, there is a 1-D horizontal scan lens 120 followed by a vertical scanner 150 (e.g., a galvo mirror) that receives each horizontally scanned beam 532 from the polygon scanner 140 through the 1-D scan lens 120 and provides the vertical scan on each horizontally scanned beam 532 at the end of each horizontal scan prior to the next horizontal scan by the next facet of the polygon scanner 140.

Under this optical design of the horizontal and vertical scanning, the 1-D scan lens 120 is placed downstream from the polygon scanner 140 and upstream from the vertical scanner 150 to focus each horizontal scanned beam on the screen 501 and minimizes the horizontal bow distortion to displayed images on the screen 501 within an acceptable range, thus producing a visually "straight" horizontal scan line on the screen 501. Such a 1-D scan lens 120 capable of producing a straight horizontal scan line is relatively simpler and less expensive than a 2-D scan lens of similar performance. Downstream from the scan lens 120, the vertical scanner 150 is a flat reflector and simply reflects the beam to the screen 501 and scans vertically to place each horizontally scanned beam at different vertical positions on the screen 501 for scanning different horizontal lines. The dimension of the reflector on the vertical scanner 150 along the horizontal direction is sufficiently large to cover the spatial extent of each scanning beam coming from the polygon scanner 140 and the scan lens 120. The system in FIG. 5 is a post-objective design because the 1-D scan lens 120 is upstream from the vertical scanner 150. In this particular example, there is no lens or other focusing element downstream from the vertical scanner 150.

This optical design eliminates the need for a complex and expensive 2-D scan lens 120 in pre-objective scanning beam displays where the scanning lens is located downstream from the two scanners 140 and 150 and focuses the a scanning excitation beam onto a screen. In such a pre-objective design, a scanning beam directed into the scan lens is scanned along two orthogonal directions. Therefore, the scan lens is designed to focus the scanning beam onto the screen along two orthogonal directions. In order to achieve the proper focusing in both orthogonal directions, the scan lens can be complex and, often, are made of multiples lens elements. In one implementation, for example, the scan lens can be a two-dimensional f-theta lens that is designed to have a linear relation between the location of the focal spot on the screen and the input scan angle (theta) when the input beam is scanned around each of two orthogonal axes perpendicular to the optic axis of the scan lens. In such a f-theta lens, the location of the focal spot on the screen is a proportional to the input scan angle (theta).

The two-dimensional scan lens such as a f-theta lens in the pre-objective configuration can exhibit optical distortions along the two orthogonal scanning directions which cause beam positions on the screen to trace a curved line. Hence, an intended straight horizontal scanning line on the screen becomes a curved line. The distortions caused by the 2-dimensional scan lens can be visible on the screen and thus degrade the displayed image quality. One way to mitigate the bow distortion problem is to design the scan lens with a complex lens configuration with multiple lens elements to reduce the bow distortions. The complex multiple lens elements can cause the final lens assembly to depart from desired f-theta conditions and thus can compromise the optical scanning performance. The number of lens elements in the assembly usually increases as the tolerance for the distortions decreases. However, such a scan lens with complex multiple lens elements can be expensive to fabricate.

To avoid the above distortion issues associated with a two-dimensional scan lens in a pre-objective scanning beam system, the following sections describe examples of a post-objective scanning beam display system, which can be implemented to replace the two-dimensional scan lens with a simpler, less expensive 1-dimensional scan lens 120 shown in FIG. 5.

Figure 6A:
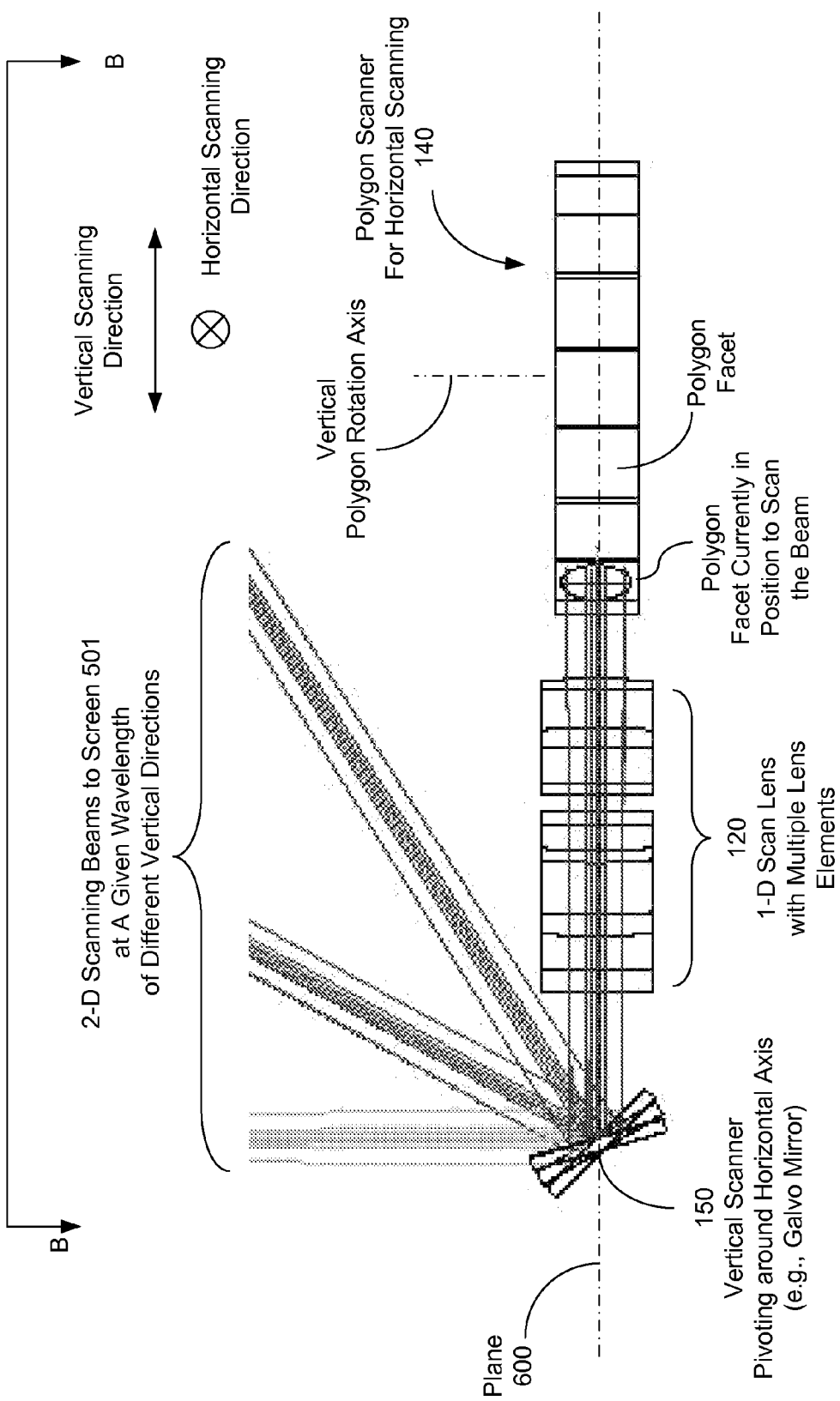
FIGS. 6A, 6B and 6C illustrate a specific example of the post-objective design of the beam scanning module in FIG. 5.
Figure 6B:
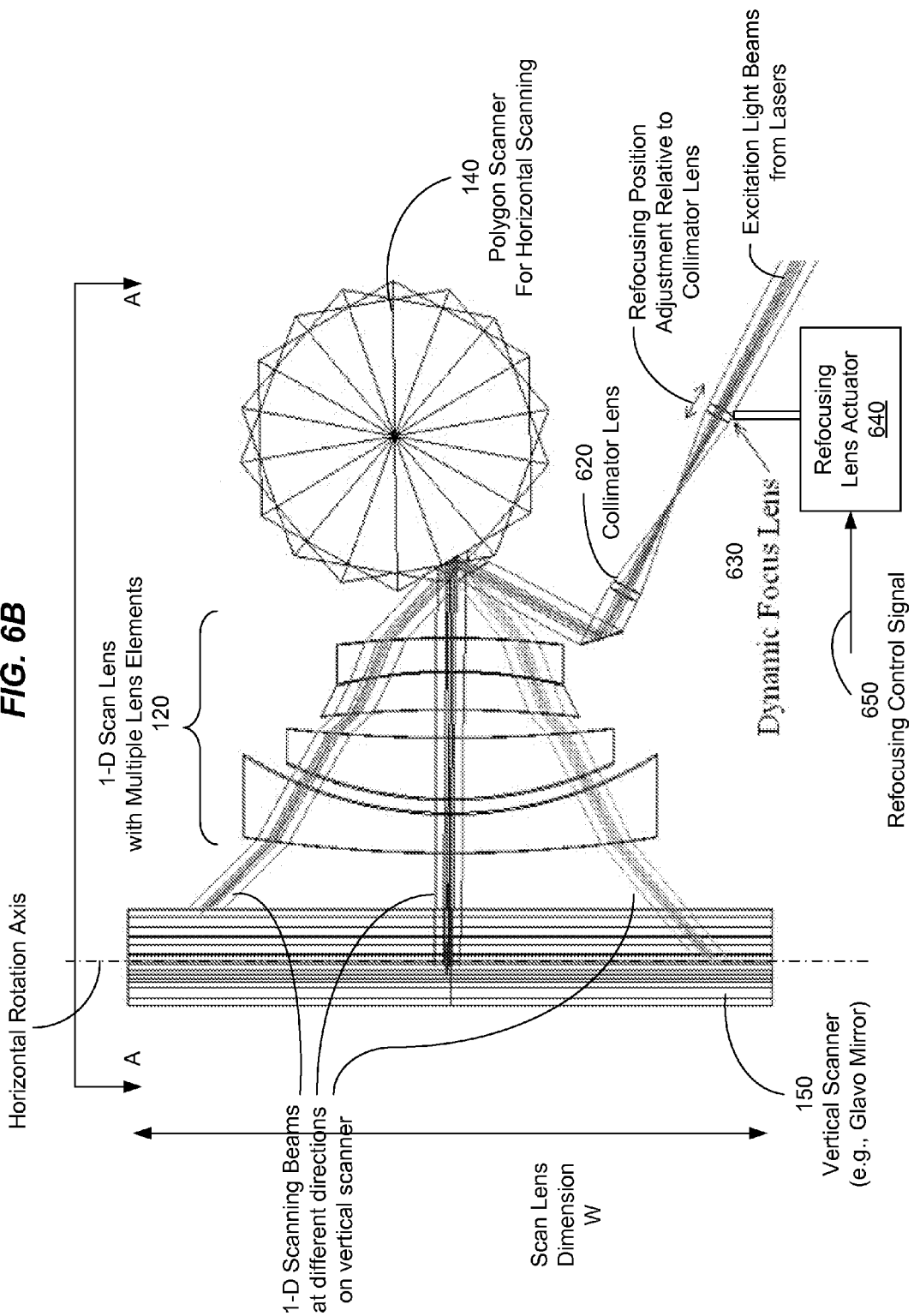
Figure 6C:
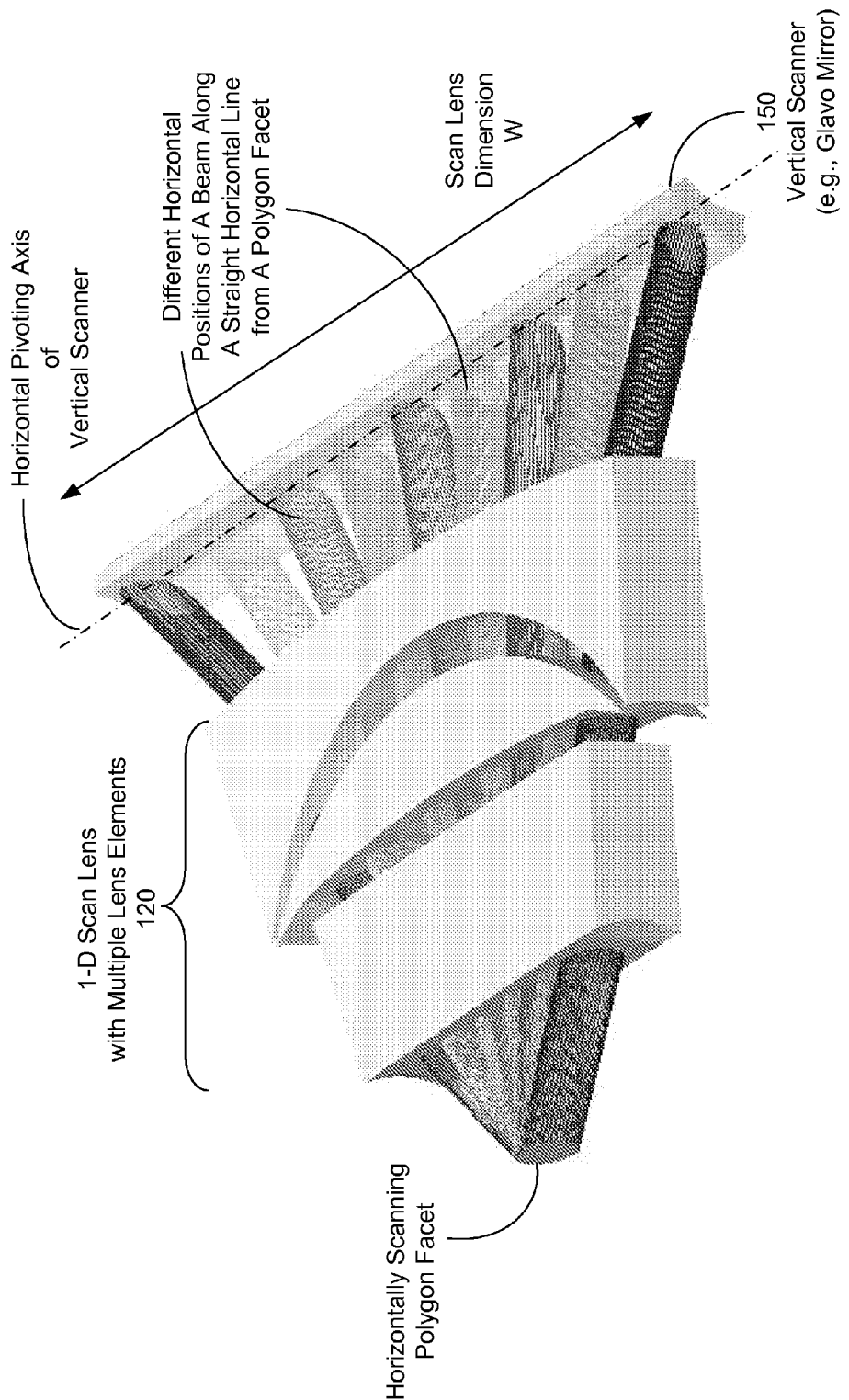

FIGS. 6A, 6B and 6C illustrate a specific example of the post-objective design of the beam scanning module in FIG. 5. The 1-D scan lens 120 can be a compound lens with multiple lens elements to achieve desired 1-D focusing of a horizontally scanned beam with no horizontal bow distortion. The 1-D scan lens 120 can have an elongated shape along the horizontal scanning direction of the beam and is placed within the same plane 600 that is perpendicular to the vertical polygon rotation axis. The vertical scanner 150 pivots around a horizontal axis which lies in the plane 600. The pivoting of the vertical scanner 150 directs beams reflected from different polygon facets to different vertical directions to trace out different horizontal scan lines on the screen 501. FIG. 6B shows the cross section view of the beam scanning module 4920 along the lines BB in FIG. 6A which is a view along the lines AA in FIG. 6B. FIG. 6C further shows a perspective view of the beam scanning module 4920 to show different horizontal positions of a horizontally scanned beam by along a straight horizontal line from a single polygon facet. The 1-D scan lens 120 in the above example is a 4-element compound lens as shown in FIGS. 6A and 6B.

Notably, the distance from the scan lens to a location on the screen 501 for a particular beam varies with the vertical scanning position of the vertical scanner 150. Therefore, when the 1-D scan lens 120 is designed to have a fixed focal distance along the straight horizontal line across the center of the elongated 1-D scan lens, the focal properties of each beam must change with the vertical scanning position of the vertical scanner 150.

Figure 7:
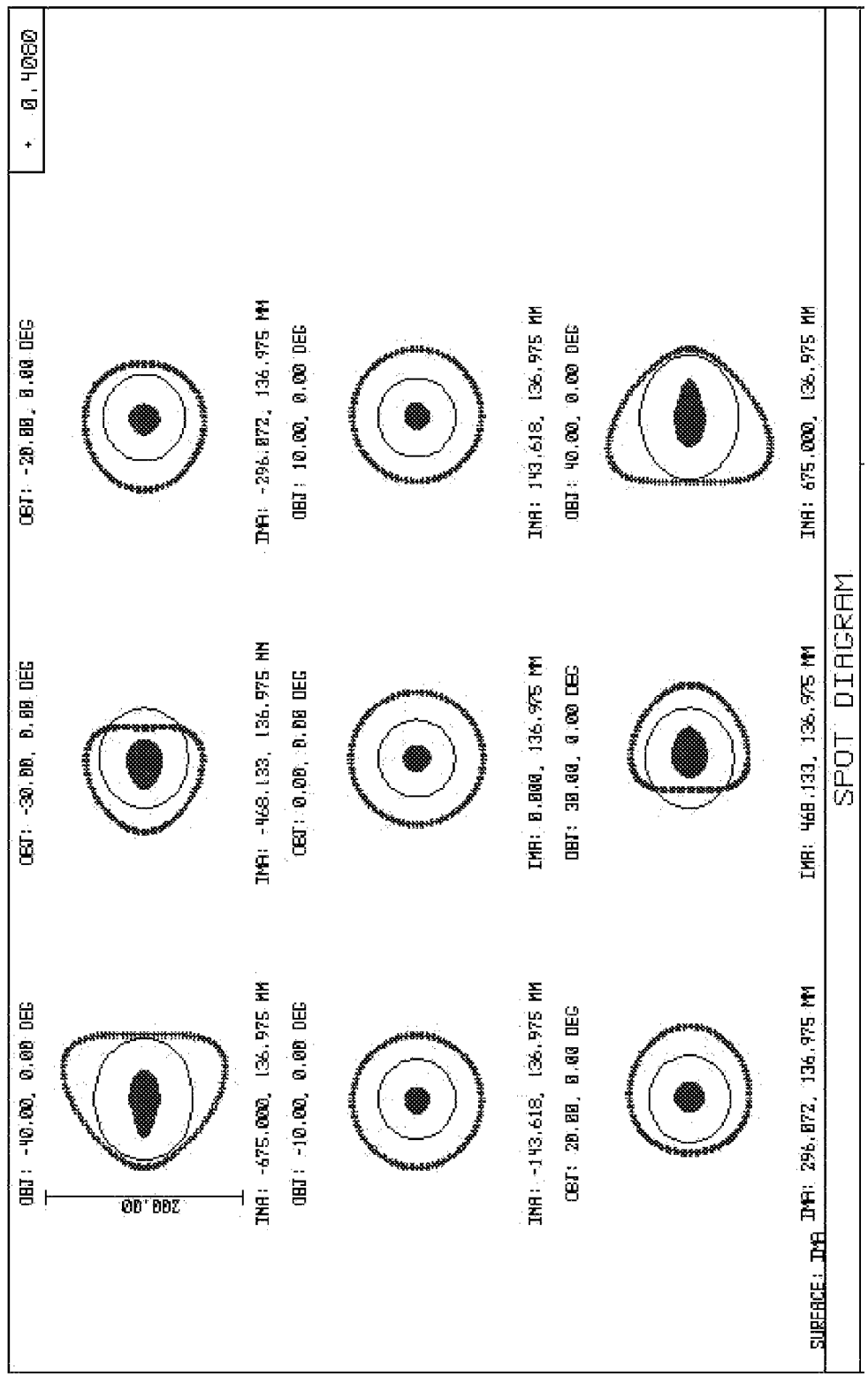
FIGS. 7, 8 and 9 show various image effects on the screen of a post-objective scanning system.

FIG. 7 illustrates examples of the changes in the beam size and shape on the screen 501 for the post-objective design in FIGS. 6A-6C along different horizontal positions on the screen 501. In this spot diagram for a horizontal set of beams at different horizontal positions and the same vertical position on the screen, the end spots located on two sides of the screen are more elongated because of the large angle of incidence of the laser which is about 42 degrees in the setup for the measurements shown.

Figure 8:
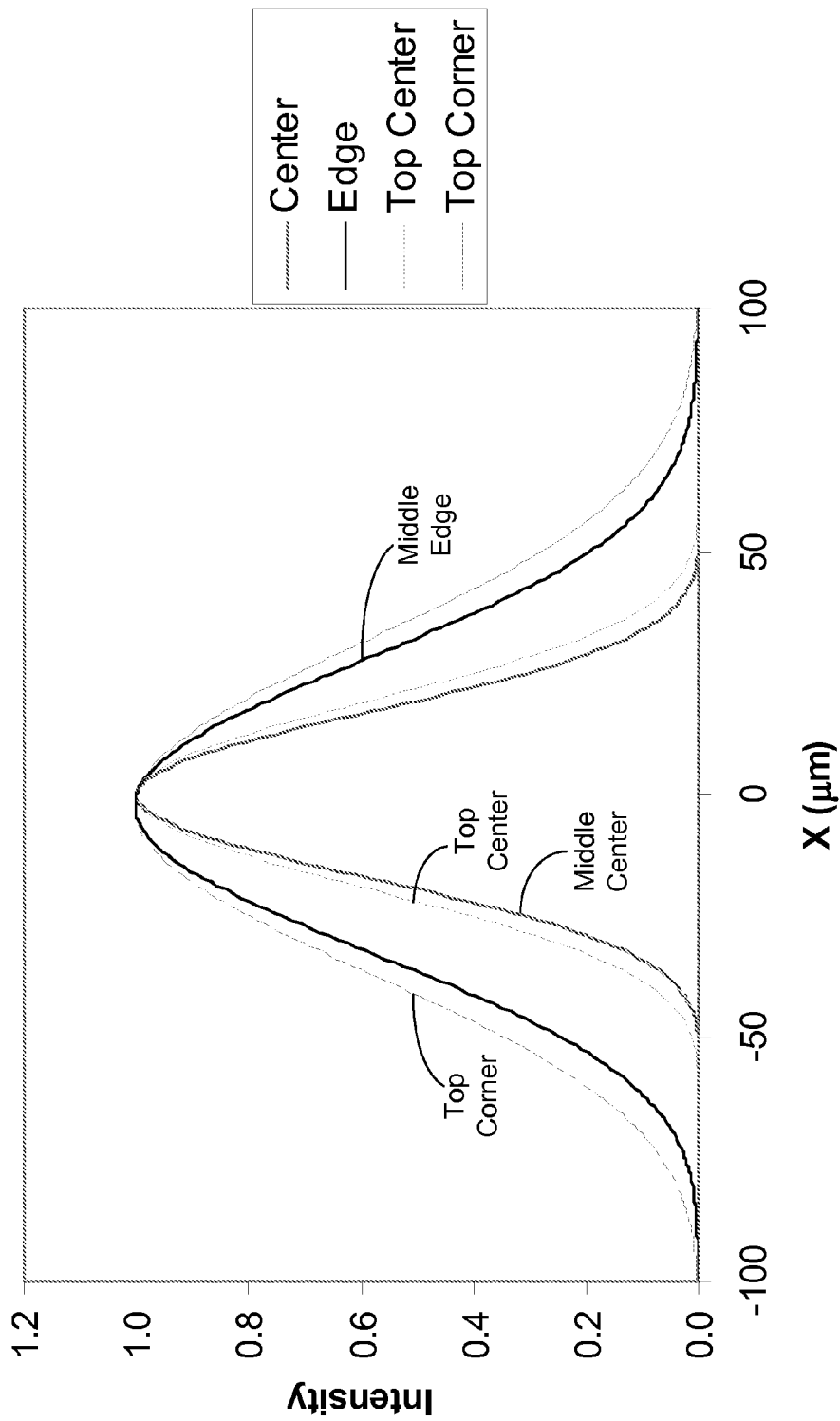

FIG. 8 further shows beam widths at different representative positions on the screen 501: middle center, middle edge, top center and top corner or edge. Hence, in order to maintain the beam size to be at a constant size, a dynamic focusing mechanism is implemented to adjust convergence of the beam going into the 1-D scan lens 120 based on the vertical scanning position of the vertical scanner 150.

Referring back to FIG. 6B, an example of the dynamic focusing mechanism is illustrated. In the optical path of the one or more laser beams from the lasers to the polygon scanner 140, a stationary lens 620 and a dynamic refocus lens 630 are used as the dynamic focusing mechanism. Each beam is focused by the dynamic focus lens 630 at a location upstream from the stationary lens 620. When the focal point of the lens 630 coincides with the focal point of the lens 620, the output light from the lens 620 is collimated. Depending on the direction and amount of the deviation between the focal points of the lenses 620 and 630, the output light from the collimator lens 620 toward the polygon scanner 140 can be either divergent or convergent. Hence, as the relative positions of the two lenses 620 and 630 along their optic axis are adjusted, the focus of the scanned light on the screen 501 can be adjusted. Alternatively, the lens 620 may be adjustable while the lens 630 is fixed in position or both lenses 620 and 630 are adjustable to change their positions for changing the focus of the beam sent to the screen.

A refocusing lens actuator 640 can be used to adjust the relative position between the lenses 620 and 630 in response to a control signal 650. In this particular example, the refocusing lens actuator 5410 is used to adjust the convergence of the beam directed into the 1-D scan lens 120 along the optical path from the polygon scanner 140 in synchronization with the vertical scanning of the vertical scanner 150. The actuator 640 is controlled to adjust the position of the lens 630 relative to an upstream focal point of the lens 620 to change the beam convergence at the entry of the 1-D scan lens 120. A control module can be provided to synchronize the actuator 640 and the vertical scanner 150 by sending a refocusing control signal 650 to control the operation of actuator 640. For example, if the collimation lens 620 with a focal length of 8 mm is used, then the adjustment can be a distance of less than 10 microns at the lens 630 to provide sufficient refocusing for a screen of over 60" in the diagonal dimension.

In addition to the beam size and the beam focus, the change of the distance from the scan lens 120 to a location on the screen 501 for a particular beam due to different vertical scanning positions of the vertical scanner 150 also creates a vertical bow distortion on the screen 501. Assuming the vertical scanner 150 directs a beam to the center of the screen 501 when the vertical angle of the vertical scanner 150 is at zero where the distance between the screen 501 and the vertical scanner 150 is the shortest. As the vertical scanner 150 changes its vertical orientation in either vertical scanning direction, the horizontal dimension of each horizontal line increases with the vertical scanning angle.

Figure 9:
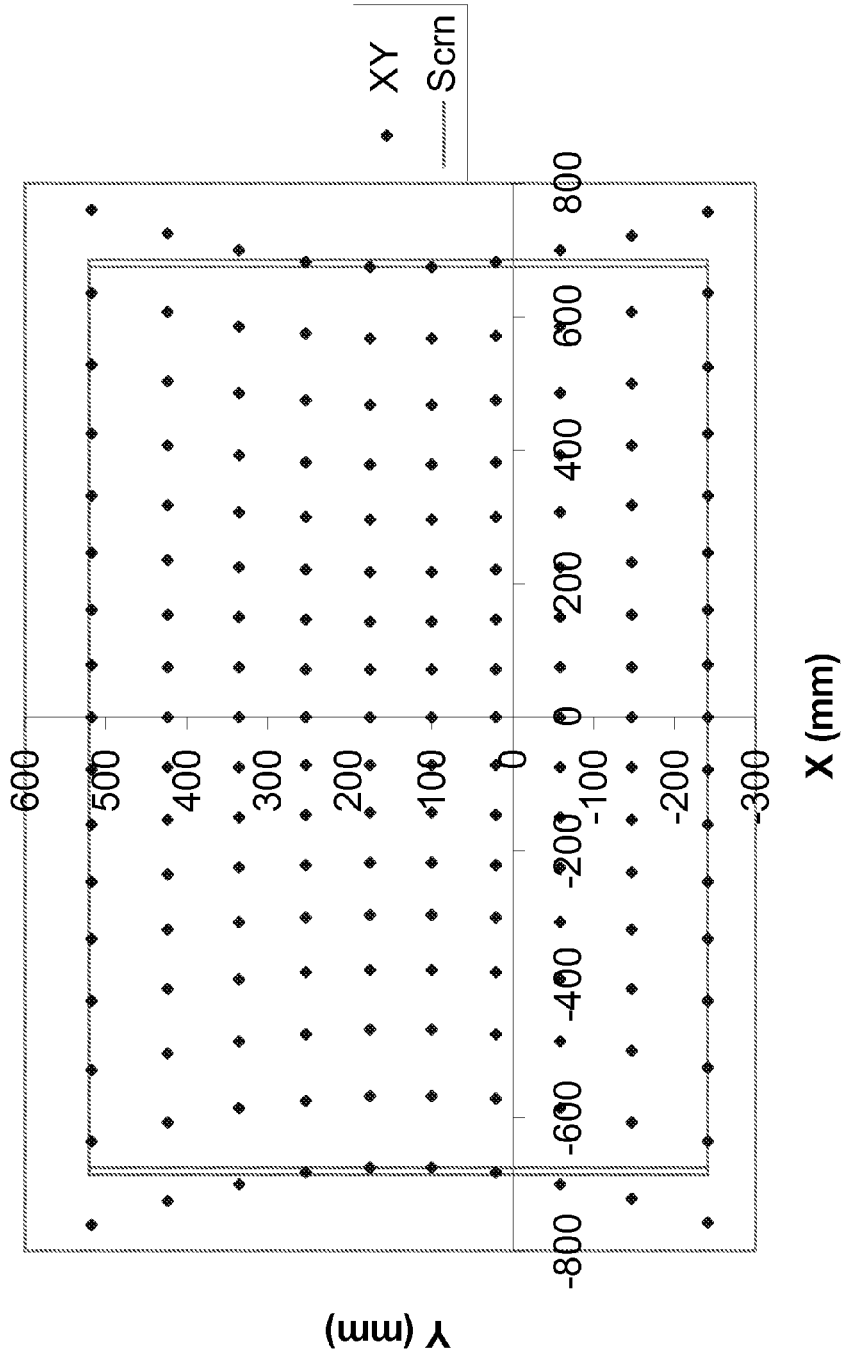

FIG. 9 illustrates this bow distortion. Different from classical barrel distortions in lenses, this distortion is geometrical in nature and is caused by the change in the vertical scanning angle of the vertical scanner 150. This distortion essentially changes the beam spot spacing of beam spots from a regular chain of optical pulses in each scanning beam along the horizontal direction across the screen 501. Therefore, controlling timing of laser pulses in the scanning beam during each horizontal scan can be applied to correct this distortion.

During a horizontal scan, the time delay in timing of a pulse can cause the corresponding position of the laser pulse on the screen to spatially shift downstream along the horizontal scan direction. Conversely, an advance in timing of a pulse can cause the corresponding position of the laser pulse on the screen to spatially shift upstream along the horizontal scan direction. A position of a laser pulse on the screen in the horizontal direction can be controlled electronically or digitally by controlling timing of optical pulses in the scanning beam. Therefore, the timing of the pulses in the scanning beam can be controlled to direct each optical pulse to a location that reduces or offsets the horizontal displacement of the beam caused by the vertical scanning of the vertical scanner 150. This can be achieved by obtaining the amounts of the horizontal position shift at each beam location caused by the vertical scanning in each of all horizontal scan lines at different vertical scanning positions on the screen. The timing of the laser pulses is then controlled during each horizontal scanning to offset the obtained amounts of the horizontal position shift at different beam locations and at different vertical scanner positions. Notably, this control of the timing of laser pulses is separate from, and can be simultaneously implemented with, the control of timing of laser pulses in aligning laser pulses to proper phosphor color stripes during a horizontal scan based on the servo feedback described in PCT patent application No. PCT/US2007/004004 entitled "Servo-Assisted Scanning Beam Display Systems Using Fluorescent Screens" and filed Feb. 15, 2007 and published as PCT publication No. WO 2007/095329 on Aug. 23, 2007, and PCT patent application No. PCT/US2006/11757 entitled "Display Systems and Devices Having Screens With Optical Fluorescent Materials" and filed Mar. 31, 2006 and published as PCT publication No. 2006/107720 on Oct. 12, 2006. Various servo mark designs on screens and servo feedback techniques described in the above two PCT applications can be applied to the post-objective scanning beam systems described in this application. The entire disclosures of the above two PCT applications are incorporated by reference as part of the specification of this application.

Figure 10:
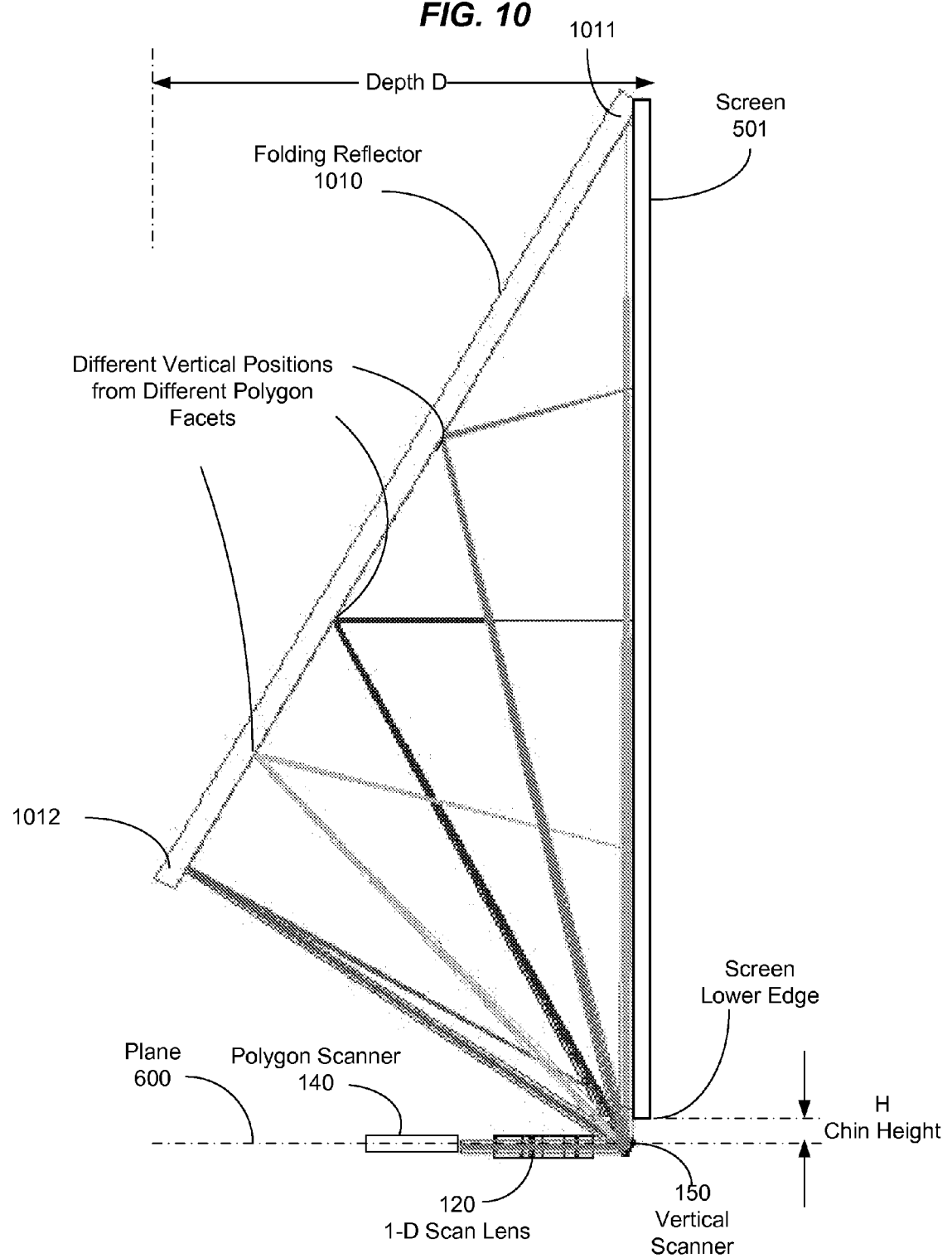
FIG. 10 shows an example of a post-objective scanning display based on a folded optical rear projection design.

The post-objective designs described above can be used to reduce dimension of a rear-projection display system using a folded optical path design. FIG. 10 shows one example of a rear-projection display based on a post-objective scanning beam design of this application. The screen 501 is placed above the plane 500 in which the polygon scanner 140, the 1-D scan lens 120 and the center of the vertical scanner 150 are located. The screen lower edge of the display area (e.g., the area with fluorescent stripes in FIG. 3A) of the screen 501 is above the plane 600 by a chin height H. It can be desirable to reduce the chin height H in such systems to reduce the size of the display. It can also be desirable to reduce the depth D of the display to about 13.5" or less. A combination of the folded optical path and the post-objective configuration allows both H and D to be minimized.

In this example, the screen 501 can be approximately perpendicular to the plane 600. A folding reflector 1010 is provided at the excitation side of the screen 501 to reflect light from the vertical scanner 150 to the screen 501. The reflector 1010 can be oriented at an angle with respect to the screen 501 and has one end 1011 to be close to or in contact with the upper side of the active display area of the screen 501 to reflect light to the upper side the active display area. The dimension and angle of the reflector 1010 are set to allow the other end 1012 of the reflector 1010 to reflect light from the vertical scanner 150 near the lower edge of the active area of the screen 501. The vertical scanner 150 can be placed as close to the inner side of the screen 501 as possible to minimize the depth D of the display.

In the above post-objective scanning designs, the 1-D scan lens is placed downstream from the polygon horizontal scanner 140 which provides a high-speed horizontal scan (e.g., 1080 successive scans per frame for a 1080-p display) and upstream from the vertical scanner 150 which provides a lower speed vertical scan (e.g., one scan per frame). Under this configuration, the refocusing control by the actuator 640 is synchronized with the lower-speed vertical scan of the vertical scanner 150 and thus allows for a slower actuator to be used as the actuator 640 for the refocusing. Accordingly, various issues associated with using a high-speed actuator for the refocusing mechanism, such as cost, feasibility, and refocusing speed and accuracy are avoided.

Referring to FIG. 6B, the vertical scanner 150 has a dimension W sufficiently large to receive the horizontally scanned beam from the 1-D scan lens 120. This dimension W is much larger (e.g., 134 mm) than the vertical scanner used in pre-objective scanning system and can present technical issues in designing the vertical scanner 150. For example, the distortion in the shape of the vertical scanner 150 can distort a horizontal scan line and thus compromise the image quality. Electromagnetic galvo mirrors can be used to implement the vertical scanner 150.

Figure 11:
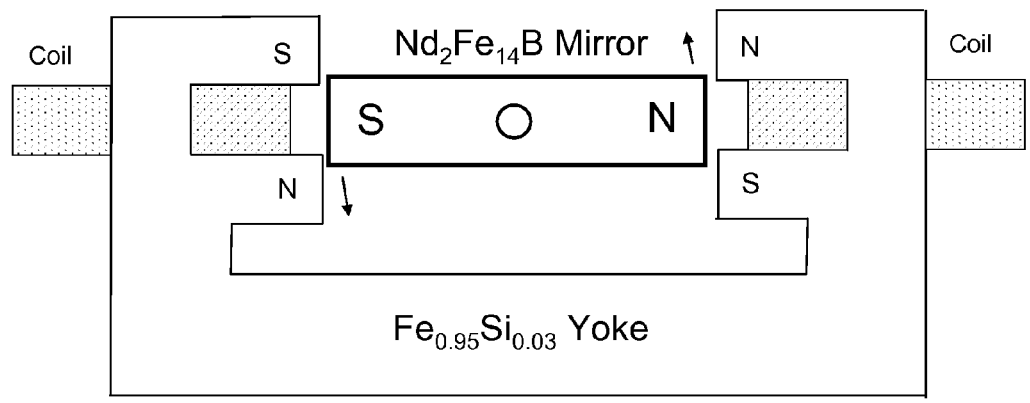
FIGS. 11-13 show examples of the vertical scanner for post-objective scanning systems.
Figure 12:
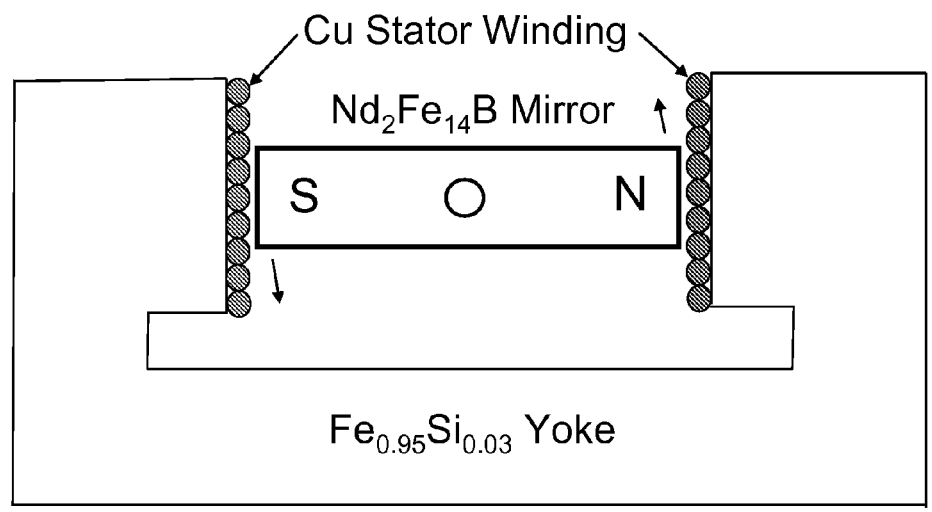
Figure 13:
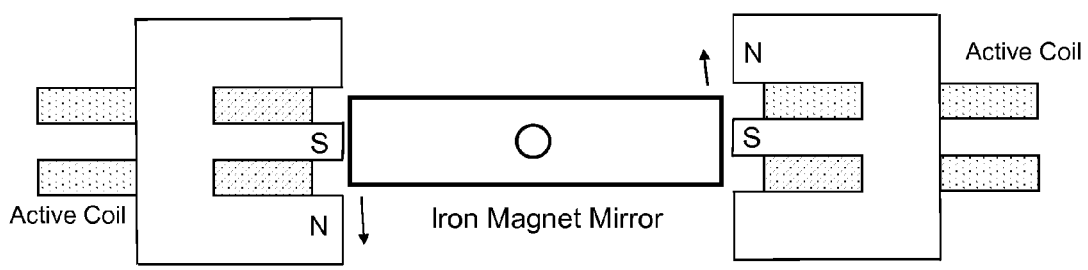

FIGS. 11, 12 and 13 illustrate three examples where the coils are designed to provide a torque along the full length of the mirror. FIG. 11 shows a permanent magnet type rotor with a slotted stator. In FIG. 12, a permanent magnet type rotor with smooth stator windings is shown. FIG. 13 shows a stepper motor type galvo motor-mirror where the mirror can be hollowed out to reduce the inertia.

Notably, the various servo control techniques described in connection with the pre-objective display systems can be applied to the post-objective scanning beam displays.

The post-objective scanning beam systems based on the designs described in this application can be applied to display systems and other optical systems that use scanning beams to produce optical patterns. For example, laser printing systems can also use the above described post-objective scanning systems where the screen is replaced by a printing medium (e.g., paper, fabric, or a master printing plate).

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few implementations are disclosed. However, it is understood that variations and enhancements may be made.

What is claimed is:

1. A scanning beam system, comprising:
   an optical module operable to produce a scanning beam of excitation light having optical pulses that carry image information; and
   a fluorescent screen comprising parallel fluorescent stripes that are displaced from one another along a first direction perpendicular to the parallel fluorescent stripes which are elongated along a second direction, the parallel fluorescent stripes absorbing the excitation light and emitting visible fluorescent light to produce images carried by the scanning beam,
   wherein the optical module comprises:
   a light source to produce the beam of excitation light;
   a horizontal polygon scanner to scan the beam of excitation light along the first direction on the screen;
   a vertical scanner having a single mirror that scans back and forth to scan the beam of excitation light from the polygon scanner along the second direction on the screen;
   a 1-dimensional scan lens placed between the polygon scanner and the vertical scanner to direct the beam of excitation light from the polygon scanner along a line on the vertical scanner and to focus the beam of excitation light onto the screen; and
   a controller that controls modulation of the beam of excitation light and adjust timings of the optical pulses, in response to displacements in position of the optical pulses along the first direction on the screen caused by scanning of the beam of excitation light along the second direction by the vertical scanner, to reduce the displacements in position of the optical pulses.

2. The system as in claim 1, further comprising:
   a beam focusing element placed between the light source and the horizontal polygon scanner to adjust a focus of light on the screen;
   an actuator coupled to the beam focusing element to adjust a position of the beam focusing element, in response to a control signal, to adjust the focus in synchronization with a scanning position of the vertical scanner.

3. The system as in claim 2, wherein:
   the beam focusing element comprises two lenses separated from each other, and
   the actuator is engaged to at least one of the two lenses to adjust a spacing between the two lenses.

4. The system as in claim 1, wherein:
   the light source includes one or more diode lasers that produce the beam of excitation at an excitation wavelength, each diode laser being directly modulated to produce a modulated beam of optical pulses that carry image information under a control of the controller.

5. The system as in claim 1, wherein:
the vertical scanner includes a galvanometer engaged to the single minor to scan the single mirror back and forth.

6. The system as in claim 1, wherein:
two adjacent parallel fluorescent stripes are made of different materials that emit visible light of different colors.

7. The system as in claim 1, wherein the san lens is a f-theta lens.

8. The system as in claim 1, wherein:
the screen is located near the vertical scanner; and
the system includes a reflector positioned above the plane defined by positions of the horizontal polygon scanner, the scan lens and the vertical scanner, wherein the reflector is oriented and positioned to receive the beam reflected from and scanned by the vertical scanner and to reflect the beam to the screen along a folded optical path between the vertical scanner and the screen.

9. The system as in claim 8, wherein:
the screen is located, along with the reflector, on one side of the horizontal polygon scanner, the scan lens and the vertical scanner.

10. A scanning beam system, comprising:
a light source to produce a beam of light having optical pulses that carry image information;
a horizontal polygon scanner to scan the beam along a first direction at a first scanning rate;
a vertical scanner located downstream from the horizontal polygon scanner in a path of the beam of light and having a single mirror that scans back and forth to scan the beam from the polygon scanner along a second direction different from the first direction at a second scanning rate less than the first scanning rate;
a 1-dimension scan lens placed between the polygon scanner and the vertical scanner to direct the beam from the polygon scanner along a line on the vertical scanner and to focus the beam onto a reference surface;
a beam focusing element placed between the light source and the horizontal polygon scanner to adjust a focus of the beam on the reference surface; and
an actuator coupled to the beam focusing element to adjust a position of the beam focusing element, in response to a control signal based on a variation in beam size with scanning of the single mirror in the vertical scanner, to adjust the focus in synchronization with a scanning position of the vertical scanner to reduce a variation in beam size of the beam on the screen with the scanning of the vertical scanner.

11. The system as in claim 10, wherein:
the beam of light is at one wavelength.

12. The system as in claim 10, wherein:
the beam of light comprises light of at least two different wavelengths.

13. The system as in claim 10, wherein:
the beam focusing element comprises a first lens and a second lens that are spaced from each other in an optical path of the beam of light, and
the actuator is engaged to at least one of the first and second lenses to adjust a spacing between the first and second lenses.

14. The system as in claim 10, comprising:
a screen located near the vertical scanner and oriented to be perpendicular to a direction from the horizontal polygon scanner to the scan lens and the vertical scanner, the screen having a screen surface as the reference surface; and
a reflector positioned above the plane in which the horizontal polygon scanner, the scan lens and the vertical scanner are located and oriented to receive the beam reflected from and scanned by the vertical scanner and to reflect the beam to the screen.

15. The system as in claim 14, wherein:
the reflector is oriented to have
a first end located close to a first end of the screen away from the vertical scanner to direct the beam from the vertical scanner to the first end of the screen, and
a second end to direct the beam from the vertical scanner to a second end of the screen that is close to the vertical scanner.

16. The system as in claim 14, wherein:
the screen is located, along with the reflector, on one side of the plane in which the horizontal polygon scanner, the scan lens and the vertical scanner are located.

17. The system as in claim 10, comprising:
a controller that controls modulation of the beam of light and controls timing of the optical pulses in the beam of light, in response to a distortion in positions of the optical pulses on the reference surface caused by scanning of the beam along the second direction by the second scanner, to correct the distortion.

18. A method for scanning a beam of sequential optical pulses in time along two directions on a target surface, comprising:
scanning the beam with a first scanner to scan the beam along a first direction at a first scanning rate;
directing the beam out of the first scanner into a second scanner to scan the beam along a second direction different from the first direction at a second scanning rate less than the first scanning rate;
using a 1-dimension scan lens placed between the first and the second scanners to focus the beam onto the target surface;
controlling a focus of the beam in synchronization with a scanning position of the second scanner to control focusing of the beam on the target surface to counter a variation in beam size on the target surface due to scanning of the second scanner; and
controlling timing of the optical pulses in the beam, in response to displacements in position of the optical pulses along the first direction on the target surface caused by scanning of the beam along the second direction by the second scanner, to reduce the displacements in position of the optical pulses.

19. The method as in claim 18, comprising:
using two lenses spaced from each other in an optical path of the beam to adjust a relative position of the two lenses in controlling the focus of the beam.

20. A scanning beam system, comprising:
a plurality of diode lasers to produce beams of excitation light at an excitation wavelength, each diode laser being directly modulated to produce optical pulses that carry image information;
a controller that controls the diode lasers to directly modulate driving currents of the diode lasers in producing the beams of excitation light;
a screen comprising parallel light-emitting stripes that are displaced from one another along a first direction perpendicular to the parallel light-emitting stripes which each are elongated along a second direction, two adjacent parallel light-emitting stripes being made of different materials that emit visible light of different colors by absorbing the excitation light to produce images carried by the beams of excitation light;

a horizontal polygon scanner in an optical path of the beams of excitation light between the diode lasers and the screen to scan the beam along the first direction on the screen at a first scanning rate;

a vertical scanner located in the optical path of the beams of excitation light between the horizontal polygon scanner and the screen and having a galvanometer and a single mirror engaged to the galvanometer, the vertical scanner scanning back and forth to scan the beams of excitation light from the polygon scanner along the second direction on the screen at a second scanning rate less than the first scanning rate;

a 1-dimension scan lens placed between the polygon scanner and the vertical scanner to direct the beams of excitation from the polygon scanner along a line on the vertical scanner and to direct the beam onto the screen;

a beam focusing element placed between the diode lasers and the horizontal polygon scanner to adjust a focus of the beam on the reference surface;

an actuator coupled to the beam focusing element to adjust a position of the beam focusing element, in response to a variation in beam size on the screen caused by scanning of the single minor in the vertical scanner, to adjust the focus in synchronization with scanning of the vertical scanner to reduce a variation in beam size of the beam on the screen; and means for controlling timings of the optical pulses, in response to displacements in position of the optical pulses along the first direction on the screen caused by scanning of the beam of excitation light along the second direction by the vertical scanner, to reduce or offset the displacements in position of the optical pulses.

21. The system as in claim 20, comprising:

a relay optics module located in the optical path between the diode lasers and the horizontal polygon scanner to reduce spacing of the beams of excitation to form a compact set of the beams of excitation that spread within a facet dimension of the horizontal polygon scanner.

22. The system as in claim 20, comprising:

a reflector positioned above a plane defined by the horizontal polygon scanner, the scan lens and the vertical scanner, wherein the reflector is oriented and positioned to receive the beam reflected from and scanned by the vertical scanner and to reflect the beam to the screen along a folded optical path between the vertical scanner and the screen.

23. The system as in claim 22, wherein:

the screen is located, along with the reflector, on one side of the horizontal polygon scanner, the scan lens and the vertical scanner.

* * * * *

UNITED STATES PATENT AND TRADEMARK OFFICE
CERTIFICATE OF CORRECTION

PATENT NO. : 7,697,183 B2
APPLICATION NO. : 11/742014
DATED : April 13, 2010
INVENTOR(S) : Phillip H. Malyak, John Uebbing and Roger A. Hajjar It is certified that error appears in the above-identified patent and that said Letters Patent is hereby corrected as shown below:

IN THE CLAIMS:

Column 12, line 45 (Claim 1), delete "adjust" and insert --adjusts--;
Column 12, line 54 (Claim 2), after "screen;" insert --and--;
Column 13, line 5 (Claim 5), delete "minor" and insert --mirror--;
Column 13, line 9 (Claim 7), delete "san" and insert --scan--;
Column 15, line 23 (Claim 20), delete "minor" and insert --mirror--.

Signed and Sealed this

Twenty-fourth Day of August, 2010

David J. Kappos
*Director of the United States Patent and Trademark Office*